(12) United States Patent
Takeda et al.

(10) Patent No.: US 11,818,754 B2
(45) Date of Patent: Nov. 14, 2023

(54) TERMINAL, RADIO COMMUNICATION METHOD, BASE STATION, AND SYSTEM

(71) Applicant: NTT DOCOMO, INC., Tokyo (JP)

(72) Inventors: Kazuki Takeda, Tokyo (JP); Shohei Yoshioka, Tokyo (JP); Satoshi Nagata, Tokyo (JP); Lihui Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/745,386

(22) Filed: May 16, 2022

(65) Prior Publication Data

US 2022/0279571 A1  Sep. 1, 2022

Related U.S. Application Data

(63) Continuation of application No. 17/255,133, filed as application No. PCT/JP2018/024723 on Jun. 28, 2018, now abandoned.

(51) Int. Cl.
*H04W 74/00* (2009.01)
*H04W 74/08* (2009.01)

(52) U.S. Cl.
CPC ..... *H04W 74/004* (2013.01); *H04W 74/0841* (2013.01)

(58) Field of Classification Search
CPC .... B60S 1/528; B60S 1/54; B60S 1/56; H04L 1/1854; H04L 1/1861; H04L 1/189; H04W 74/004; H04W 74/0833; H04W 74/0841; H04W 76/11
See application file for complete search history.

(56) References Cited

U.S. PATENT DOCUMENTS

| | | | | |
|---|---|---|---|---|
| 11,057,935 B2* | 7/2021 | Jeon | ............... | H04W 74/0833 |
| 11,076,389 B2* | 7/2021 | Lee | ............... | H04W 72/21 |
| 11,129,201 B2* | 9/2021 | Martin | ............... | H04W 74/0833 |
| 2011/0263245 A1* | 10/2011 | Ishii | ............... | H04W 56/0015 |
| | | | | 455/423 |
| 2013/0010619 A1* | 1/2013 | Fong | ............... | H04W 72/0453 |
| | | | | 370/252 |
| 2013/0114813 A1 | 5/2013 | Chai | | |
| 2013/0242815 A1* | 9/2013 | Wang | ............... | H04L 1/1854 |
| | | | | 370/280 |
| 2018/0084455 A1 | 3/2018 | Liu et al. | | |

(Continued)

OTHER PUBLICATIONS

Notice of Reasons for Refusal issued in Japanese Application No. 2020-526830 dated Aug. 23, 2022 (6 pages).

(Continued)

*Primary Examiner* — Kashif Siddiqui
(74) *Attorney, Agent, or Firm* — Osha Bergman Watanabe & Burton LLP

(57) ABSTRACT

A terminal is disclosed including a receiver that receives a synchronization signal block (SSB); a processor that determines, based on the SSB, a time resource for a preamble used for a 2-step random access procedure, and determines, based on the SSB, a time resource for an uplink shared channel (PUSCH) used for the random access procedure; and a transmitter that transmits the preamble and the PUSCH. In other aspects a radio communication method, a base station, and a system are also disclosed.

4 Claims, 19 Drawing Sheets

(56) References Cited

U.S. PATENT DOCUMENTS

| | | | | |
|---|---|---|---|---|
| 2019/0313449 | A1* | 10/2019 | Tsai | H04W 74/006 |
| 2019/0357267 | A1* | 11/2019 | Martin | H04W 74/0833 |
| 2020/0045650 | A1 | 2/2020 | Suzuki et al. | |
| 2020/0100299 | A1* | 3/2020 | Loehr | H04W 80/02 |
| 2020/0120713 | A1* | 4/2020 | Yerramalli | H04W 74/0833 |
| 2020/0221503 | A1* | 7/2020 | Kusashima | H04W 74/0833 |
| 2020/0245364 | A1 | 7/2020 | Kim et al. | |
| 2021/0014881 | A1 | 1/2021 | Aiba et al. | |
| 2021/0144756 | A1* | 5/2021 | Wang | H04W 56/0045 |
| 2021/0144777 | A1* | 5/2021 | Tang | H04W 74/008 |
| 2021/0168862 | A1* | 6/2021 | Murray | H04W 74/002 |
| 2021/0274550 | A1* | 9/2021 | Zhang | H04W 74/0841 |
| 2022/0069954 | A1* | 3/2022 | Lei | H04W 88/02 |
| 2022/0132572 | A1* | 4/2022 | Fang | H04W 74/0808 |

OTHER PUBLICATIONS

LG Electronics Inc., "Considerations on 2-Step CBRA procedure for NR-U SA", 3GPP TSG-RAN WG2 #AH-1807, R2-1809940, Montreal, Canada, Jul. 2-6, 2018 (3 pages).

MediaTek Inc., "Remaining details on RACH procedure", 3GPP TSG RAN WG1 Meeting 90bis, R1-1718340, Prague, CZ, Oct. 9-13, 2017 (10 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).

3GPP TSG RAN WG1 Nr Ad Hoc; R1-1700892 "NR 2-step random access procedure" Samsung; Spokane, Washington, USA; Jan. 16-20, 2017 (5 pages).

3GPP TSG RAN WG1 AH_NR Meeting; R1-1700703 "2-step random access procedure" Interdigital Communications; Spokane, USA; Jan. 16-20, 2017 (5 pages).

International Search Report issued in International Application No. PCT/JP2018/024723, dated Sep. 18, 2018 (4 pages).

Extended European Search Report issued in counterpart European Patent Application No. 18925026.9, dated Jan. 4, 2022 (7 pages).

MediaTek Inc.; "Considerations on 2-step RACH physical channel design"; 3GPP TSG RAN WG1 Meeting #87, R1-1612142; Reno, USA; Nov. 14-18, 2016 (3 pages).

Samsung; "Discussion on simplified RACH procedure"; 3GPP TSG RAN WG1 Meeting #87, R1-1612468; Reno, Nevada, USA; Nov. 14-18, 2016 (5 pages).

CATT; "Discussion of Simplified RACH Procedures"; 3GPP TSG RAN WG1 Meeting #87, R1-1611376; Reno, USA; Nov. 14-18, 2016 (3 pages).

Office Action issued in the counterpart Indonesian Patent Application No. P00202100562, dated Feb. 3, 2023 (5 pages).

\* cited by examiner

TERMINAL, RADIO COMMUNICATION METHOD, BASE STATION, AND SYSTEM

CROSS-REFERENCE TO RELATED APPLICATIONS

The present application is a continuation application and, thereby, claims benefit under 35 U.S.C. § 120 to U.S. patent application Ser. No. 17/255,133 filed on Dec. 22, 2020, titled, "USER TERMINAL," which is a national stage application of PCT Application No. PCT/JP2018/024723, filed on Jun. 28, 2018. The contents of these applications are incorporated by reference in their entirety.

TECHNICAL FIELD

The present disclosure relates to a terminal, a radio communication method, a base station, and a system in a next-generation mobile communication system.

BACKGROUND ART

In the UMTS (Universal Mobile Telecommunications System) network, the specifications of long-term evolution (LTE) have been specified for the purpose of further increasing high speed data rates, providing lower delays and the like (see Non Patent Literature 1). In addition, for the purpose of further widening the bandwidth and increasing the speed from the LTE (also referred to as LTE Rel. 8 or 9), the LTE advanced (LTE-A, also referred to as LTE Rel. 10, 11, or 12) has been specified, and the LTE successor system (for example, referred to as a future radio access (FRA), a 5th generation mobile communication system (5G), a new radio (NR), a new radio access (NX), a future generation radio access (FX), an LTE Rel. 13, 14, or 15 or later) is also being studied.

In the existing LTE system (for example, LTE Rel. 8 to 13), the user terminal (user equipment (UE)) controls reception of the downlink shared channel (for example, physical downlink shared channel (PDSCH)) based on downlink control information (DCI, also referred to as DL assignment, etc.) from the radio base station (base station). Also, the user terminal controls transmission of the uplink shared channel (for example, physical uplink shared channel (PUSCH)) based on the DCI (also referred to as UL grant).

Further, in the existing LTE system, when UL synchronization is established between the radio base station and the user terminal, UL data can be transmitted from the user terminal. Therefore, the existing LTE systems support random access procedures (referred to as random access channel (RACH) procedures) for establishing UL synchronization.

The random access procedure for the existing LTE system supports four steps (messages 1 to 4). For example, in the random access procedure, the user terminal transmits a random access preamble (PRACH) corresponding to the message 1 to the base station, and acquires information on UL transmission timing by a response signal (random access response or message 2) from the radio base station for the PRACH. Thereafter, the user terminal transmits the message (message 3) on an uplink shared channel based on the information acquired by the message 2, and then receives the message 4 (also called contention-resolution) transmitted from the base station.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In future radio communication systems (for example, NR, 5G, 5G +, or Rel. 16 or later), it is examined to perform communication using beam forming (BF). For example, it is assumed that the UE and the base station use at least one of a plurality of transmission/reception points and a plurality of beams to transmit/receive a signal (or channel).

Further, in the future radio communication system, it is conceivable that the random access procedure is performed in fewer steps (for example, two steps) than the existing four steps.

However, in the future radio communication system, how to control the random access procedure using fewer steps than the existing four steps becomes a problem, but the specific operation and the like have not been sufficiently examined. When the random access procedure is not performed appropriately, the quality of communication is likely to deteriorate.

The present disclosure has been made in view of such a situation, and an object of the present disclosure is to provide a user terminal capable of appropriately performing communication even when a random access procedure is performed in fewer steps than the existing steps.

Solution to Problem

A user terminal according to one aspect of the present disclosure includes a transmitting section that transmits a first UL signal including a preamble used for random access and a second UL signal including a message, a receiving section that receives a response signal to the first UL signal and the second UL signal after the second UL signal is transmitted, and a control section that controls a transmission by applying at least one of frequency multiplexing and time multiplexing to the first UL signal and the second UL signal.

Advantageous Effects of Invention

According to one aspect of the present disclosure, the communication can be appropriately performed even when the random access procedure is performed in fewer steps than the existing steps.

DESCRIPTION OF EMBODIMENTS

Existing LTE systems (for example, LTE Rel. 8-13) support a random access procedure for establishing UL synchronization. The random access procedure includes a contention-based random access (also referred to as CBRA or the like) and a non-contention based random access (also referred to as Non-CBRA, Contention-Free Random Access (CFRA), or the like).

In the contention-based random access (CBRA), the user terminal transmits a randomly selected preamble from a plurality of preambles (also referred to as a random access preamble, a random access channel (Physical Random Access Channel (PRACH)), RACH preamble, and the like) defined in each cell. Further, the contention-based random access is a user terminal-driven random access procedure, and can be used, for example, at the time of an initial access, at the time of starting or resuming UL transmission, and the like.

On the other hand, in the non-contention based random access (Non-CBRA) (Contention-Free Random Access (CFRA)), a radio base station uniquely allocates preamble to a user terminal by a downlink (DL) control channel (Physical Downlink Control Channel (PDCCH), Enhanced PDCCH (EPDCCH), and the like), and the user terminal transmits the preamble allocated by the radio base station. The non-contention based random access is a network-driven random access procedure, and can be used, for example, at the time of handover, at the time of starting or resuming DL transmission (at the time of starting or resuming transmission of DL retransmission instruction information in UL), or the like.

Figure 1:
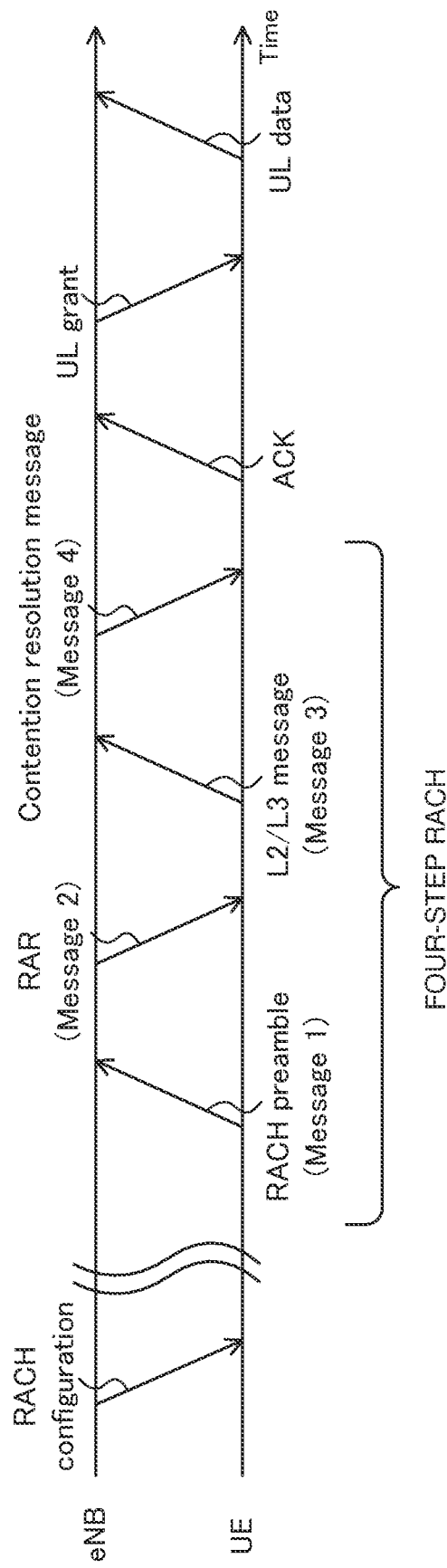
FIG. 1 is a diagram illustrating an example of four-step RACH.

FIG. 1 is a diagram illustrating an example of a contention-based random access. In FIG. 1, the user terminal receives in advance information (PRACH configuration information) indicating a configuration (PRACH configuration and RACH configuration) of a random access channel (PRACH) by system information (for example, MIB (Mater Information Block) and/or SIB (System Information Block)) or higher layer signaling (for example, RRC (Radio Resource Control) signaling).

The PRACH configuration information can indicate, for example, a plurality of preambles (for example, preamble format) defined in each cell, time resources (for example, system frame number and subframe number), frequency resources (for example, offset (prach-FrequencyOffset) indicating a starting position of six resource blocks (PRB: Physical Resource Block)), and the like used for PRACH transmission.

As illustrated in FIG. 1, when the user terminal transitions from an idle (RRC IDLE) state to an RRC connection (RRC CONNECTED) state (for example, at the time of an initial access), when the user terminal is in the RRC connection state but UL synchronization is not established (for example, at the time of starting or resuming of the UL transmission), or the like, one of a plurality of preambles indicated by the PRACH configuration information is randomly selected, and the selected preamble is transmitted by the PRACH (message 1).

When detecting a preamble, the radio base station transmits a random access response (RAR) as a response (message 2). If the user terminal fails to receive the RAR within a given duration (RAR window) after the transmission of the preamble, the transmit power of the PRACH increases and the preamble is transmitted again (retransmitted). Increasing the transmit power at the time of the retransmission is also called power ramping.

The user terminal that receives the RAR adjusts UL transmission timing based on timing advance (TA) included in the RAR, and establishes the UL synchronization. In addition, the user terminal transmits a control message of a higher layer (L2/L3: Layer 2/Layer 3) with the UL resource specified by a UL grant included in the RAR (Message 3). The control message includes a user terminal identifier (UE-ID). The identifier of the user terminal may be UE-ID of the higher layer such as C-RNTI (Cell-Radio Network Temporary Identifier) in the RRC connection state and S-TMSI (System Architecture Evolution-Temporary Mobile Subscriber Identity) in the idle state.

The radio base station transmits a contention-resolution message (message 4) in response to the control message of the higher layer. The contention-resolution message is transmitted based on an identifier address of the user terminal included in the control message. The user terminal that succeeds in detecting a contention-resolution message transmits an acknowledge (ACK) in HARQ (Hybrid Automatic Repeat reQuest) to the radio base station. As a result, the user terminal in the idle state transitions to an RRC connection state.

On the other hand, the user terminal that fails to detect the contention-resolution message determines that the contention has occurred, reselects the preamble, and repeats the random access procedures of the messages 1 to 4. When detecting that the contention has been resolved by the ACK from the user terminal, the radio base station transmits the UL grant to the user terminal. The user terminal starts UL data using the UL resources allocated by the UL Grant.

In the contention-based random access as described above, when the user terminal desires to transmit the UL data, the random access procedure can be started autonomously. In addition, after the UL synchronization is established, the UL data is transmitted using the UL resources that are uniquely allocated to the user terminal by the UL grant, so highly reliable UL transmission is possible.

However, in the future radio communication system, it is examined to perform the random access procedure using fewer steps than the existing four steps. As an example, there is a random access procedure using two steps. The random access procedure using two steps are also referred to as a two-step random access procedure, a two-step RACH, or a two-step RACH.

Figure 2:
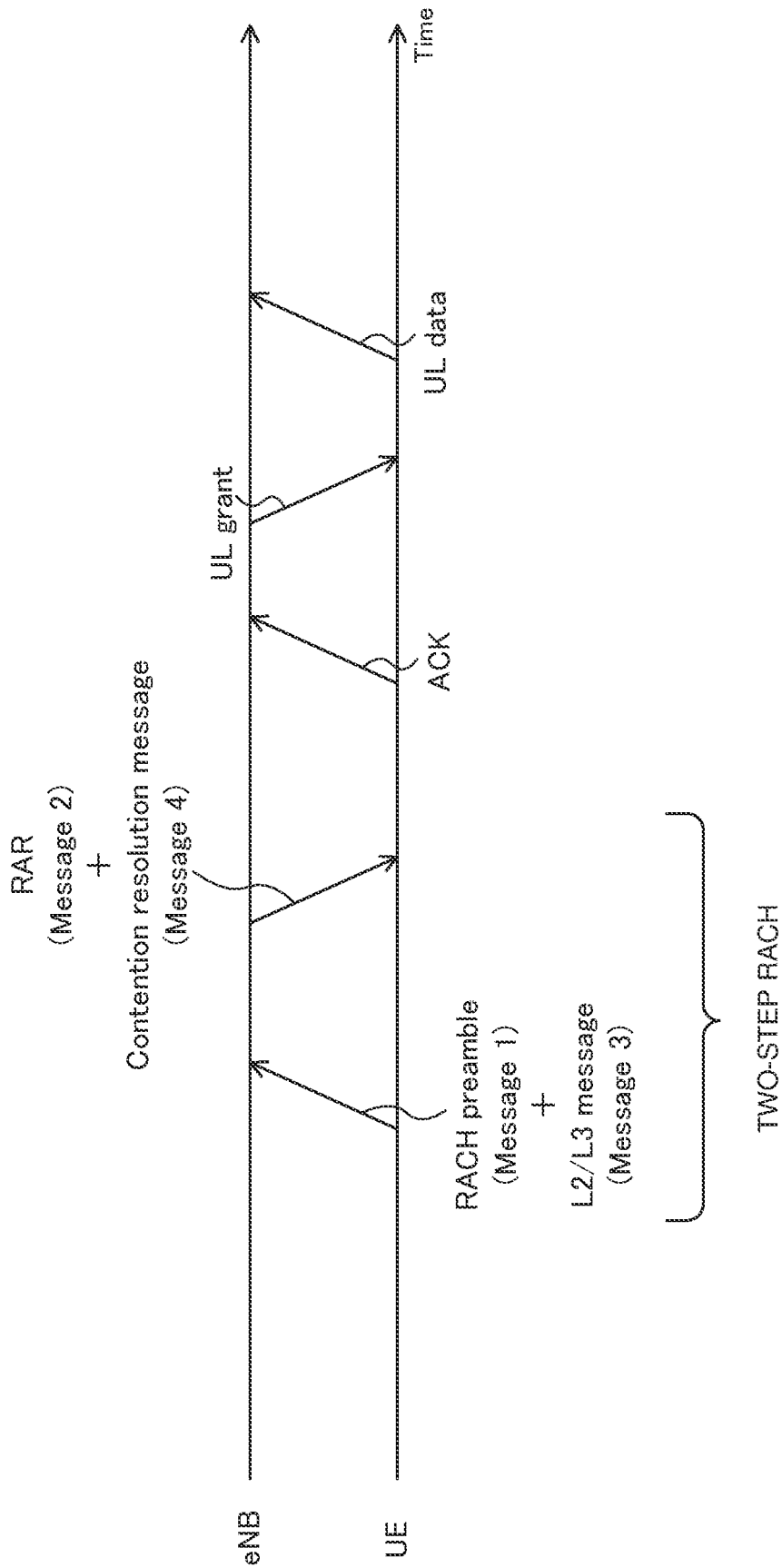
FIG. 2 is a diagram illustrating an example of two-step RACH.

The two-step RACH may include a first step of performing transmission from the UE to the base station and a second step of performing transmission from the base station to the UE (see FIG. 2).

For example, in the first step, at least one (hereinafter, also referred to as UL signal/UL channel) of the UL signal and the UL channel including the preamble and the message may be transmitted from the UE to the base station. The preamble may be configured to play a role similar to the message 1 (PRACH) in the existing random access procedure. The message may be configured to play a role similar to the message 3 (PUSCH) in the existing random access procedure.

In addition, in the second step, at least one (hereinafter, also referred to as DL signal/DL channel) of the DL signal and the DL channel including the response and the contention-resolution may be transmitted from the base station to the UE. The response may be configured to play a role similar to the message 2 (random access response (RAR) transmitted by PDSCH) in the existing random access procedure. The contention-resolution may be configured to play a role similar to the message 4 (PDSCH) in the existing random access procedure.

In this way, how to control the transmission/reception when performing the random access procedure using a smaller number of steps than the existing LTE system becomes a problem. For example, how to control the transmission of the preamble (or preamble part) and the message (or message part) in the first step becomes a problem.

As one aspect of the present disclosure, the present inventors have focused on the fact that there are the preamble part and the message part as the UL signal/UL channel transmitted in the first step, and conceived that the first UL signal/UL channel including the preamble part and the second UL signal/UL channel including the message part are transmitted using different resources.

Alternatively, when applying the two-step RACH, a case is considered where the transmission of the first step may fail. For example, how to control the two-step RACH when the transmission of at least one of the preamble part and the message part fails becomes a problem.

As another aspect of the present disclosure, the present inventors have focused on the fact that the transmission of the preamble part and the transmission of the message part may fail, and conceived that the retransmission (for example, the presence/absence of the retransmission, the UL signal/channel to be retransmitted, and the like) is controlled based on the transmission result of the preamble part and the message part.

Hereinafter, the present embodiments will be described with reference to the drawings. Each of the following aspects may be applied alone or practiced in combination as appropriate. In the following description, the case is illustrated where the first UL signal/UL channel includes the preamble part and the second UL signal/UL channel includes the message part, but the present embodiment is not limited thereto. The first UL signal/UL channel may include a part of the message part, or the second UL signal/UL channel may include a part of the preamble part.

Further, in the following description, a two-step random access procedure (two-step RACH) is illustrated, but the present embodiment is not limited thereto. It may be applied to a random access procedure other than two steps (for example, three steps including PDCCH order (message 0) or the like).

(First Aspect)

In the first aspect, the two-step RACH in the case of using at least one (hereinafter, also referred to as a plurality of TRP/a plurality of beams) of a plurality of transmission/reception points (TRP) and a plurality of beams will be described. Obviously, the system configuration to which the present embodiment is applicable is not limited thereto.

In the first step, a first resource used for transmitting the first UL signal/UL channel (hereinafter referred to as the first UL signal) and a second resource used for the second UL signal/UL channel (hereinafter referred to as the second UL signal) are at least frequency-multiplexed (FDM). The first resource corresponds to a radio resource (for example, time and frequency resources) for the preamble part. The second resource corresponds to the radio resource for the message part.

The first resource and the second resource may be configured to be adjacent in the frequency direction. Alternatively, the first resource and the second resource may be configured not to be adjacent (formed to be spaced apart from each other) in the frequency direction. The resource may be configured in at least one of PRB unit, slot unit, mini slot unit, and symbol unit. By multiplexing the first resource and the second resource in the frequency direction, a time interval occupied by the first resource and the second resource can be reduced. This makes it possible to reduce the time interval in which at least one of the transmission and reception beams is applied to the first resource and the second resource, which is suitable for a system performing analog beam forming.

Figure 3:
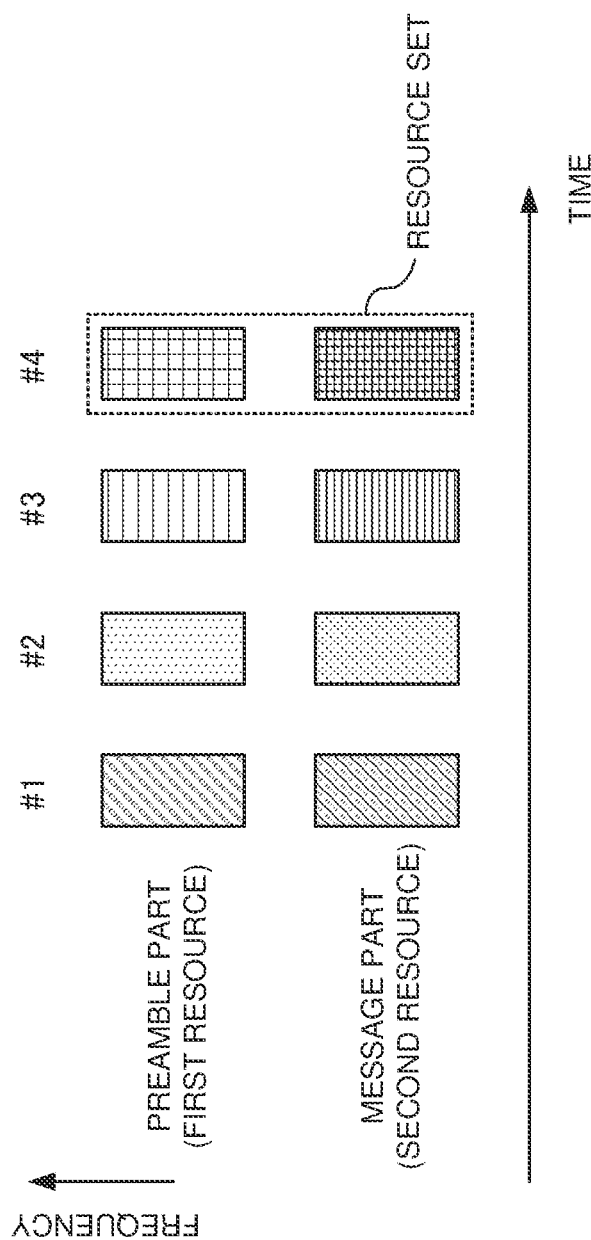
FIG. 3 is a diagram illustrating an example of a method of transmitting a preamble part and a message part.

A plurality of the first resource and the second resource may each be configured. For example, the first resource and the second resource may be configured to correspond to a plurality of TRPs/beams, respectively (see FIG. 3). FIG. 3 illustrates a case where a plurality of combinations of the first resource and the second resource to be frequency-multiplexed are configured. Further, the plurality of first resources #1 to #4 may be arranged (for example, time-multiplexed) in different time domains, and the plurality of second resources #1 to #4 may also be arranged in different time domains.

Here, a case is illustrated where a set (combination) of the first resource #1 and the second resource #1 to be frequency-multiplexed, a set of the first resource #2 and the second resource #2 to be frequency-multiplexed, a set of the first resource #3 and the second resource #3 to be frequency-multiplexed, and a set of the first resource #4 and the second resource #4 to be frequency-multiplexed are configured in the UE.

For example, the first resource #1 and the second resource #1 correspond to the same TRP #1 (or the same beam #1). Similarly, the first resource #2 and the second resource #2 may correspond to the same TRP #2 (or the same beam #2), the first resource #3 and the second resource #3 may correspond to the same TRP #3 (or the same beam #3), and the first resource #4 and the second resource #4 may correspond to the same TRP #4 (or the same beam #4).

Information on the set of the first resource and the second resource may be notified from the base station to the UE using at least one of the higher layer signaling (for example, RRC signaling), MAC CE, and the downlink control information. Alternatively, the set of the first resource and the second resource may be predefined in the specification.

Note that the base station may notify the UE of one of the first resource (or the second resource), and determine the corresponding second resource (or the first resource) based on given conditions. The given conditions (for example, frequency offset, etc.) may be notified from the base station to the UE, or may be predefined in the specifications.

The UE may select a given resource set from a plurality resource sets based on at least one (DL signal/DL channel) of the given DL signal and DL channel. For example, the UE determines a given TRP/given beam corresponding to the DL signal/DL channel with the highest received power (for example, RSRP). Next, the UE selects the given resource set associated (or most relevant) with the given TRP/given beam.

The DL signal/DL channel may be a DL reference signal (DL-RS) or another DL signal. For example, the DL signal/DL channel may be at least one of a synchronization signal (SS), a broadcast channel (PBCH: Physical Broadcast Channel), a synchronization signal block (SSB), a mobility reference signal (MRS: Mobility RS), and a channel state information-reference signal (CSI-RS), CSI-RS for tracking, a beam-specific signal, and the like, or may be a signal (for example, signal configured by changing at least one of a density and a cycle) configured by expanding or modifying these signals.

The synchronization signal may be, for example, at least one of a primary synchronization signal (PSS) and a secondary synchronization signal (SSS). The SSB is a signal block including the synchronization signal and the broadcast channel, and may be called an SS/PBCH block or the like.

When the UE selects the first resource (or the first UL signal including a preamble) and the second resource (or the second UL signal including the message) based on the given DL signal/DL channel, the given association may be assumed. For example, the UE may control a transmission process on the assumption that at least one of quasi-co-location (QCL), a TCI state, and spatial association is identical between the selected first and second resources and the given DL signal/DL channel.

In addition, the base station may also control a reception process on the assumption that at least one of the quasi-co-location (QCL), the TCI state, and the spatial association is identical between the first resource (or the first UL signal including the preamble) and the second resource (or the second UL signal including the message).

The QCL (Quasi-Co-Location) is an indicator indicating statistical properties of the channel/signal, and is also called pseudo-collocation. The UE (user terminal) may control the reception process or the transmission process of the channel/signal based on the information (QCL information) on the QCL of at least one (channel/signal) of the given channel and signal. The reception process corresponds to, for example, at least one of demapping, demodulation, and decoding. The transmission process corresponds to at least one of mapping, modulation, and code.

For example, it may be mean that when one signal and other signals have a QCL relationship, it may be assumed that at least one of Doppler shift, Doppler spread, average delay, delay spread, and spatial parameter (for example, Spatial Rx Parameter) is identical (QCL for at least one of them) between the plurality of different signals.

Note that the spatial reception parameter may correspond to a reception beam (for example, reception analog beam) or a transmission beam (for example, transmission analog beam) of the user terminal, and the beam may be specified based on the spatial QCL. In the present disclosure, the QCL and at least one element of the QCL, may be read as sQCL (spatial QCL).

The TCI (Transmission Configuration Indication or Transmission Configuration Indicator) state is also called the transmission configuration indication state or the TCI-state, and may indicate QCL information on a given signal/channel (for example, PDSCH, PDCCH, PUCCH, PUSCH, or the like).

The TCI state is identified by a given identifier (TCI state ID (TCI-StateId)), and may indicate (include) a target channel/signal (or the reference signal for the channel (or an antenna port of the reference signal)) and another signal (for example, information on QCL (QCL information (QCL-Info)) with another downlink reference signal (DL-RS) or uplink reference signal (UL-RS)).

Spatial relation information (spatialrelationinfo) corresponds to information that indicates the configuration of the spatial association between the reference RS and the UL signal/UL channel. For example, a plurality of candidate beams for PUSCH transmission may be configured by PUSCH spatial relation information. The space relation information is notified to the UE by the higher layer (for example, RRC signaling). Note that the space relation information may be defined for other channels (for example, PRACH and the like), or the space relation information corresponding to PUSCH may be applied to other channels and the like.

In addition, in this specification, a plurality of TRP/a plurality of beams may be read as the TCI state or a sounding reference signal resource indicator (SRI: SRS resource indicator).

<UE Behavior>

Figure 4:
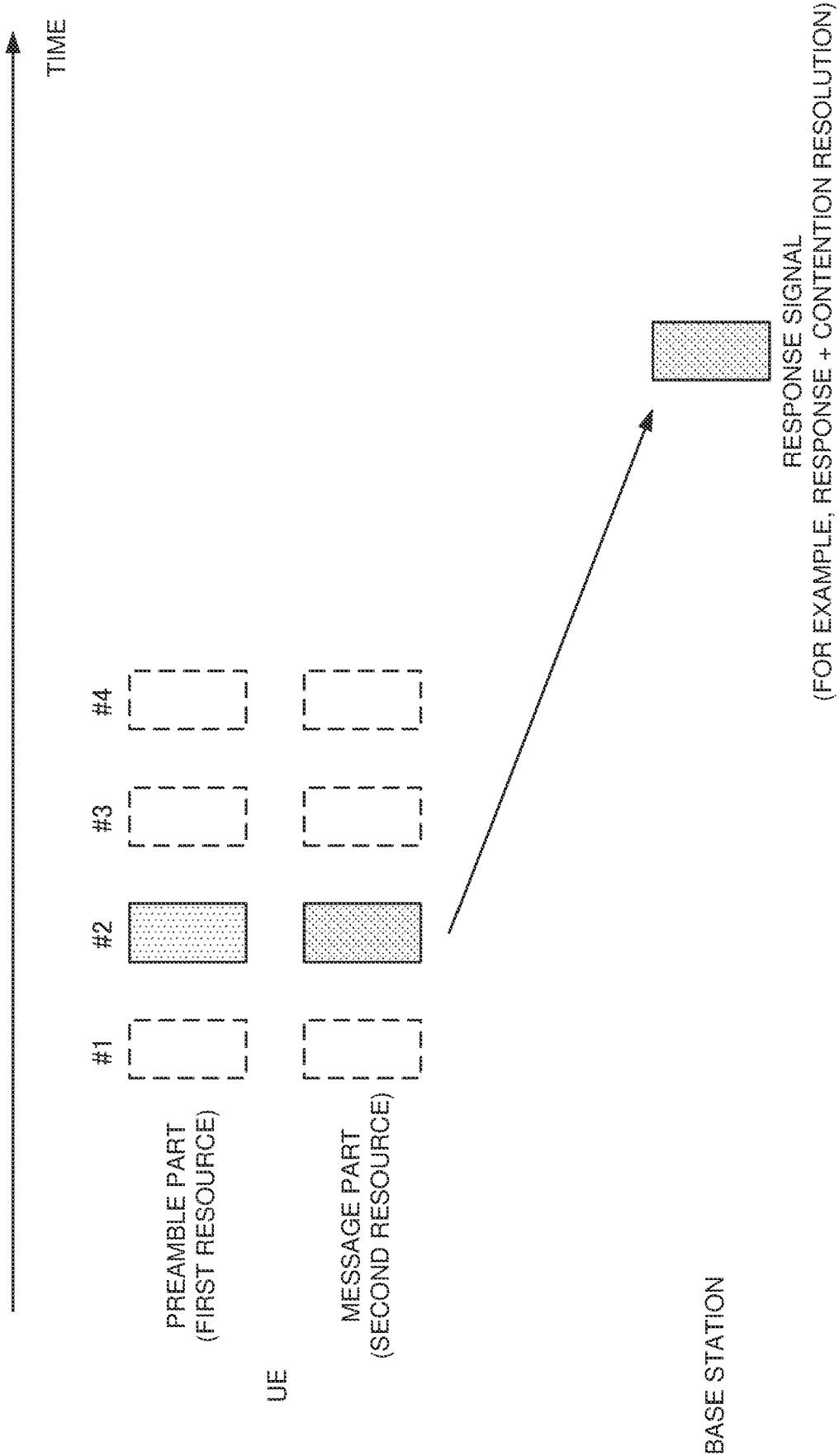
FIG. 4 is a diagram illustrating another example of the method of transmitting a preamble part and a message part.

FIG. 4 illustrates an example of the UE behavior of the first step in the two-step RACH. Here, a case is illustrated where as a combination (resource set) of the first resource and the second resource to be frequency-multiplexed, four combinations are set, but the setting number of resource set is not limited thereto.

The UE selects a given resource set from the plurality of resource sets based on the given conditions (for example, received power of the DL signal/DL channel). For example, the UE selects the resource set associated with the SS/PBCH block or the CSI-RS that has the highest received power (for example, RSRP). The association information between the SS/PBCH block or CSI-RS and the resource set may be notified in advance from the base station to the UE, or may be defined in advance in the specifications.

Here, the case is illustrated where the resource set associated with the SS/PBCH block or CSI-RS having high received power is a combination (resource set #2) of the first resource #2 and the second resource #2. The UE selects the resource set #2, uses the first resource #2 (or first beam #2) to transmit the preamble part, and uses the second resource #2 (or the second beam #2) to transmit the message part. The first beam #2 and the second beam #2 may be the same beam.

The UE may transmit the preamble part (first UL signal) and the message part (second UL signal) using different channels. For example, the preamble part may be transmitted using the PRACH, and the message part may be transmitted using the PUSCH. Alternatively, both the preamble part and the message part may be transmitted using the PRACH or the PUSCH.

When receiving the first UL signal and the second UL signal transmitted from the UE, the base station transmits a response signal to the UE after a given duration. The response signal may include a random access response, a message for contention-resolution, and the like. The base station may transmit the response signal using the TRP or beam corresponding to the resource set (or timing received by the base station) used by the UE for transmission.

In this way, by arranging the first UL signal (or UL channel) corresponding to the given TRP/beam and the second UL signal (or UL channel) in different frequency domains, it is possible to flexibly control the resource allocation of the preamble part and the message part.

(Second Aspect)

In the second aspect, in the first step, the first resource used for the transmission of the first UL signal and the second resource used for the transmission of the second UL signal is at least time-multiplexed (TDM). The first resource corresponds to a radio resource (for example, time and frequency resources) for the preamble part. The second resource corresponds to a radio resource for the message part. The resource may be configured in at least one of PRB unit, slot unit, mini slot unit, and symbol unit.

Figure 5:
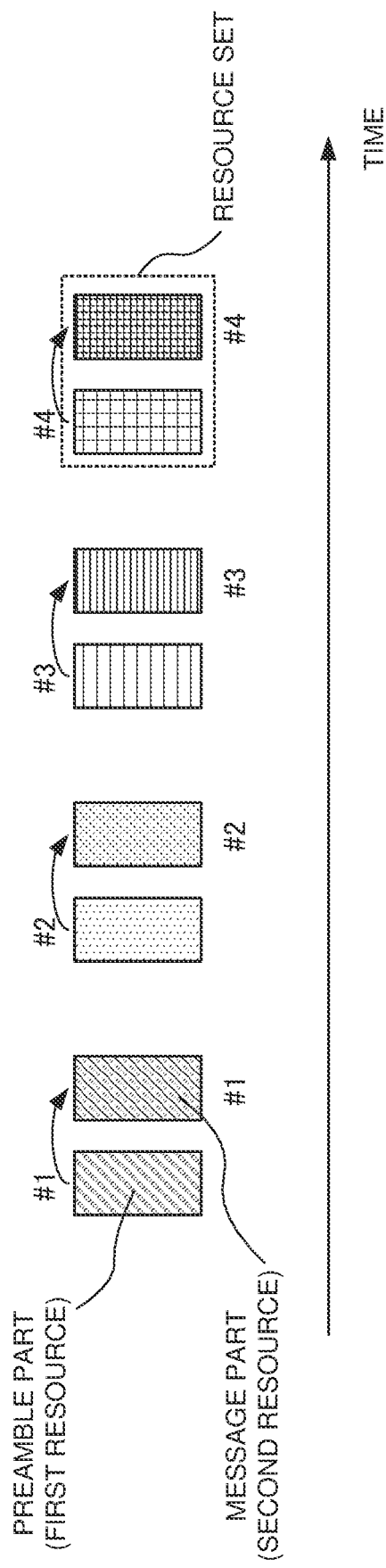
FIG. 5 is a diagram illustrating another example of the method of transmitting a preamble part and a message part.

A plurality of the first resource and the second resource may each be configured. For example, the first resource and the second resource may be configured to correspond to a plurality of TRPs/beams, respectively (see FIG. 5). FIG. 5 illustrates a case where a plurality of combinations of the first resource and the second resource to be time-multiplexed are configured. Further, the plurality of first resources #1 to #4 may be arranged (for example, time-multiplexed) in different time domains, and the plurality of second resources #1 to #4 may also be arranged in different time domains.

Here, a case is illustrated where a set of the first resource #1 and the second resource #1 to be time-multiplexed, a set of the first resource #2 and the second resource #2 to be time-multiplexed, a set of the first resource #3 and the second resource #3 to be time-multiplexed, and a set of the first resource #4 and the second resource #4 to be time-multiplexed are configured in the UE.

For example, the first resource #1 and the second resource #1 correspond to the same TRP #1 (or the same beam #1). Similarly, the first resource #2 and the second resource #2 may correspond to the same TRP #2 (or the same beam #2), the first resource #3 and the second resource #3 may correspond to the same TRP #3 (or the same beam #3), and the first resource #4 and the second resource #4 may correspond to the same TRP #4 (or the same beam #4).

Information on the set of the first resource and the second resource may be notified from the base station to the UE using at least one of the higher layer signaling (for example, RRC signaling), MAC CE, and the downlink control information. Alternatively, the set of the first resource and the second resource may be predefined in the specification.

Note that the base station may notify the UE of one of the first resource (or the second resource), and determine the corresponding second resource (or the first resource) based on given conditions. The given conditions (for example, frequency offset, etc.) may be notified from the base station to the UE, or may be predefined in the specifications.

The UE may select a given resource set from the plurality of resource sets based on the given DL signal/DL channel.

For example, the UE determines a given TRP/given beam corresponding to the DL signal/DL channel with the highest received power. Next, the UE selects the given resource set associated (or most relevant) with the given TRP/given beam.

When the UE selects the first resource (or the first UL signal including a preamble) and the second resource (or the second UL signal including the message) based on the given DL signal/DL channel, the given association may be assumed. For example, the UE may control a transmission process on the assumption that at least one of quasi-co-location (QCL), a TCI state, and spatial association is identical between the selected first and second resources and the given DL signal/DL channel.

In addition, the base station may also control a reception process on the assumption that at least one of the quasi-co-location (QCL), the TCI state, and the spatial association is identical between the first resource (or the first UL signal including the preamble) and the second resource (or the second UL signal including the message).

Alternatively, the UE may select a given first resource from the plurality of first resources (or preamble parts) based on the given DL signal/DL channel, and determine the second resource corresponding to the first resource selected based on the given condition. For example, the UE determines a given TRP/given beam corresponding to the DL signal/DL channel with the highest received power. Next, the UE may select the first resource associated (or most relevant) with the given TRP/given beam and determine the second resource corresponding to the first resource set.

The UE may control a transmission process on the assumption that at least one of the quasi-co-location (QCL), the TCI state, and the spatial association is identical between the selected first and second resources. In addition, the base station may control the reception process on the assumption that at least one of the quasi-co-location (QCL), the TCI state, and the spatial association is identical between the signals received by the first and second resources.

When different message parts (second resources) are configured for a plurality of preamble parts (first resources), respectively, a gap (GP) interval between the first resource and the second resource may be set. For example, the gap (GP) is formed between the first and second resources that correspond to different TRPs/beams (or different resource sets) (see FIG. 6).

Figure 6:
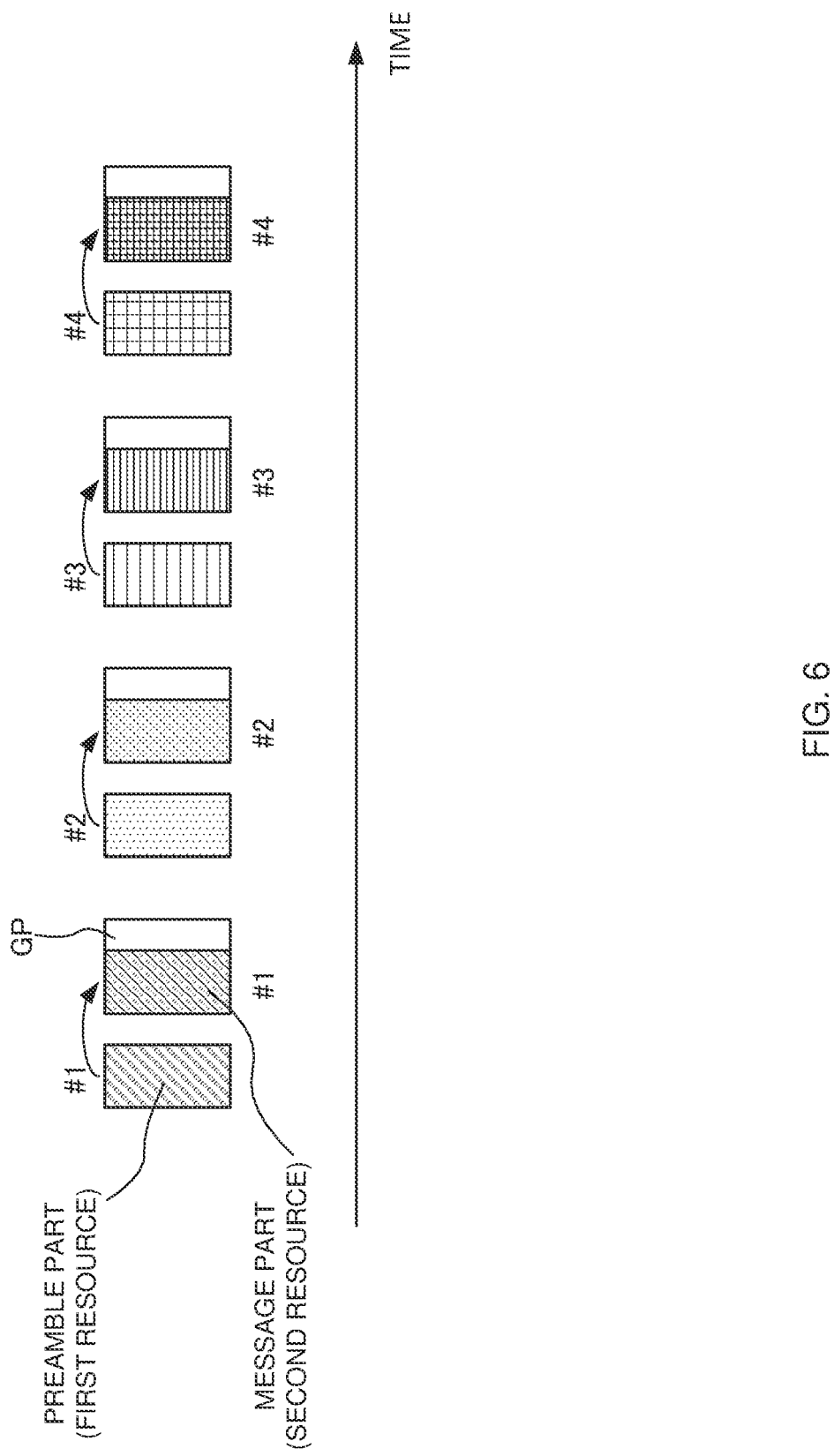
FIG. 6 is a diagram illustrating another example of the method of transmitting a preamble part and a message part.

FIG. 6 illustrates a case where the gap interval is set at a tail part of the second resource. As a result, the gap interval is arranged between the second resource #1 and the first resource #2, between the second resource #2 and the first resource #3, and between the second resource #3 and the first resource #4. As a result, even when the timing advance (TA) is applied to transmit the preamble part (PRACH) or the like, the transmission can be appropriately performed. Note that the gap interval may be set at a head part of the first resource.

Similarly, the gap may be formed between the first resource (for example, first resource #1) and the second resource (for example, second resource #1) corresponding to the same TRP/beam.

Alternatively, the gap may not be formed between the first resource (for example, first resource #1) and the second resource (for example, second resource #1) corresponding to the same TRP/beam. Resource utilization efficiency can be improved by arranging the first resource #0 and the second resource #0 without providing a gap. Note that even if there is no gap between the first resource and the second resource corresponding to the same TRP/beam, the same UE is used for transmission, so the effect is reduced even when the timing advance is applied.

<UE Behavior>

Figure 7:
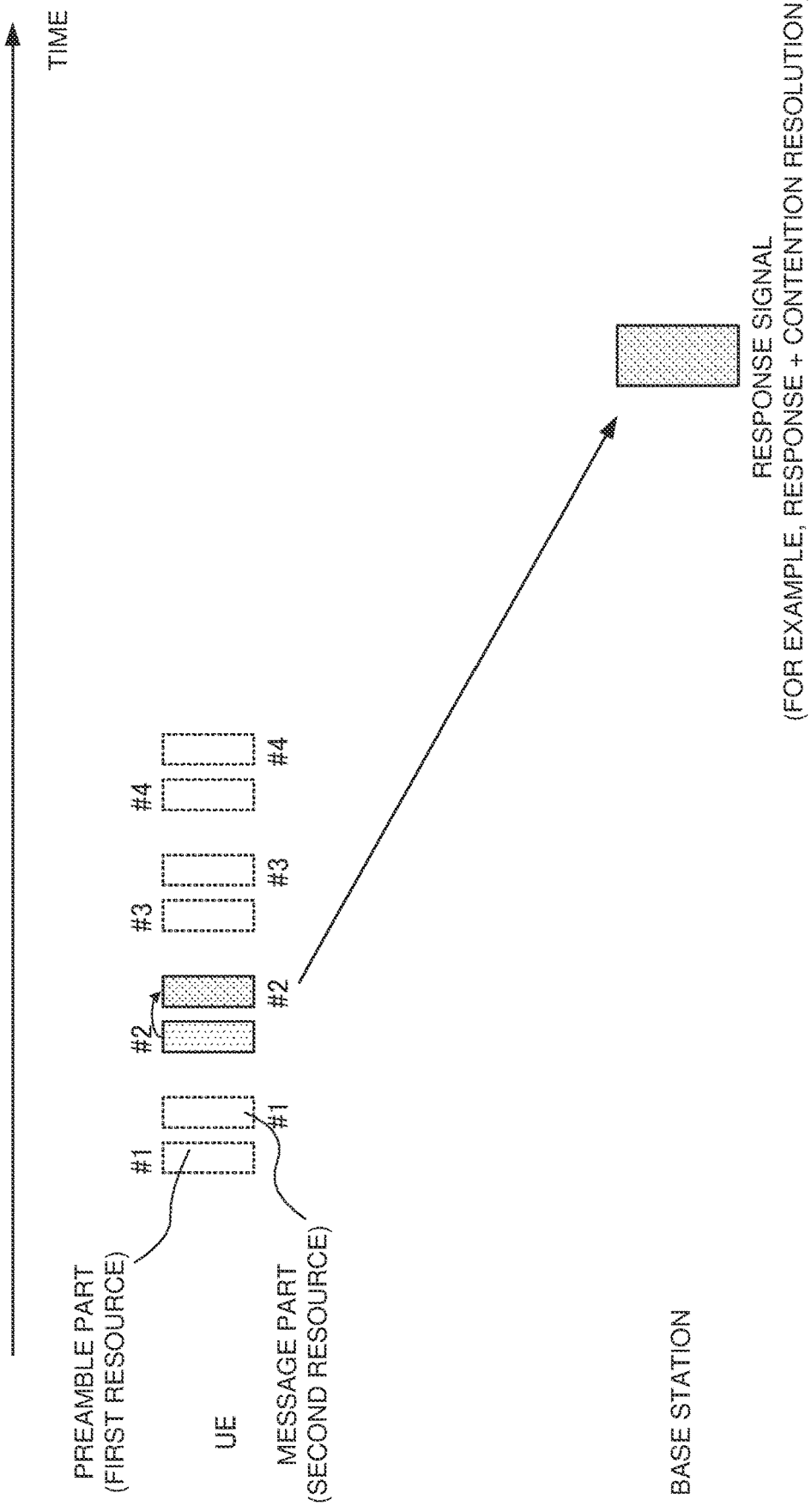
FIG. 7 is a diagram illustrating another example of the method of transmitting a preamble part and a message part.

FIG. 7 illustrates an example of the UE behavior of the first step in the two-step RACH. Here, a case is illustrated where as a combination (resource set) of the first resource and the second resource to be time-multiplexed, four combinations are set, but the setting number of resource set is not limited thereto.

The UE selects a given resource set from the plurality of resource sets based on the given conditions (for example, received power of the DL signal/DL channel). For example, the UE selects the resource set associated with the SS/PBCH block or CSI-RS that has the highest received power. The association information between the SS/PBCH block or CSI-RS and the resource set may be notified in advance from the base station to the UE, or may be defined in advance in the specifications.

Here, the case is illustrated where the resource set associated with the SS/PBCH block or CSI-RS having high received power is a combination (resource set #2) of the first resource #2 and the second resource #2. The UE selects the resource set #2, uses the first resource #2 (or first beam #2) to transmit the preamble part, and uses the second resource #2 (or the second beam #2) to transmit the message part. The first beam #2 and the second beam #2 may be the same beam.

The UE may transmit the preamble part (first UL signal) and the message part (second UL signal) using different channels. For example, the preamble part may be transmitted using the PRACH, and the message part may be transmitted using the PUSCH. Alternatively, both the preamble part and the message part may be transmitted using the PRACH or the PUSCH.

When receiving the first UL signal and the second UL signal transmitted from the UE, the base station transmits a response signal to the UE after a given duration. The response signal may include a random access response, a message for contention-resolution, and the like. The base station may transmit the response signal using the TRP or beam corresponding to the resource set (or timing received by the base station) used by the UE for transmission.

In this way, by arranging the first UL signal (or UL channel) corresponding to the given TRP/beam and the second UL signal (or UL channel) in different time domains, it is possible to flexibly control the resource allocation of the preamble part and the message part.

<Communization of Second Resource>

In FIGS. 5 to 7, the case is illustrated where the second resource is configured separately for each of the plurality of first resources, but the present embodiment is not limited thereto. The second resource may be configured in common for the plurality of first resources.

Figure 8:
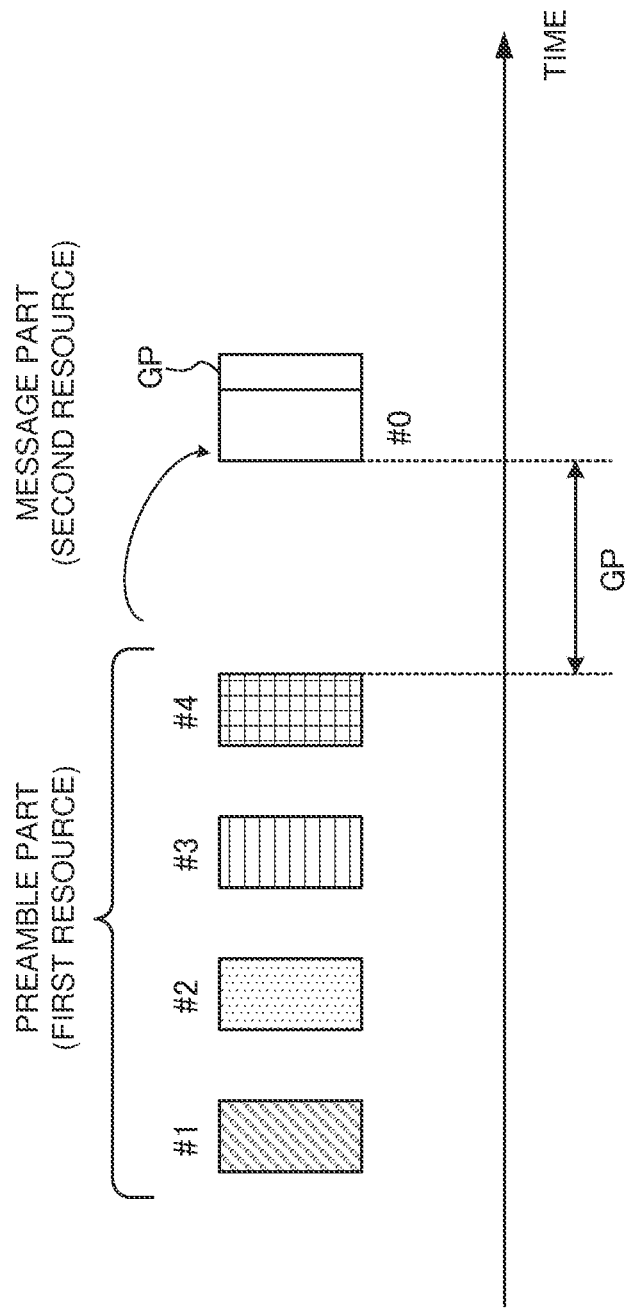
FIG. 8 is a diagram illustrating another example of the method of transmitting a preamble part and a message part.

For example, the first resource may be configured to correspond to a plurality of TRPs/a plurality of beams, respectively, and less than N second resources may be configured for a plurality of (for example, N) first resources (see FIG. 8). FIG. 8 illustrates the case where the second resource #0 is configured in common (only one) corresponding to a plurality of first resources #1 to #4. The plurality of first resources and second resources are arranged in a time-multiplexed manner.

Note that the second resource is not limited to one, and for example, the second resource corresponding to the first resources #1 and #2 and the second resource corresponding to the first resources #3 and #4 may each be configured.

The information on the first resource and the second resource may be notified from the base station to the UE using at least one of the higher layer signaling (for example, RRC signaling), MAC CE, and the downlink control information. Alternatively, the first resource and the second resource may be predefined in the specification.

Note that the base station may notify the UE of one of the first resources and determine the corresponding second resource based on the given conditions. The given conditions (for example, frequency offset, etc.) may be notified from the base station to the UE, or may be predefined in the specifications.

The UE may select a given first resource from the plurality of first resources based on the given DL signal/DL channel. For example, the UE determines a given TRP/given beam corresponding to the DL signal/DL channel with the highest received power. Next, the UE selects the given first resource associated (or most relevant) with the given TRP/given beam.

When using the second resource to transmit the message part, the UE uses transmission characteristics (or transmission conditions) corresponding to the selected first resource. For example, when transmitting the preamble part using a given beam or the like, the UE transmits the message part using the given beam used for the transmission of the preamble part. In this way, by performing the transmission using the second resource by using the transmission characteristics corresponding to the selected first resource, the message part can be appropriately transmitted even when the second resource is configured in common.

When the message part (second resource) is configured in common for the plurality of preamble parts (first resources), the gap (GP) interval between the first resource and the second resource may be set. For example, a given time interval (also called a gap interval) is set between the first resource (first resource #4 in FIG. 8) and the second resource #0 which are configured last in the time direction among the first resources. The given time interval may be a preset given value (for example, 4 ms) or a value set in the UE from base station.

As a result, the reception timing of the preamble part and the reception timing of the message part in the base station can be shifted. As a result, the base station can appropriately determine which preamble part the message part is associated with.

Further, as illustrated in FIG. 6 above, the gap interval may be set at the tail part of the second resource.

<UE Behavior>

Figure 9:
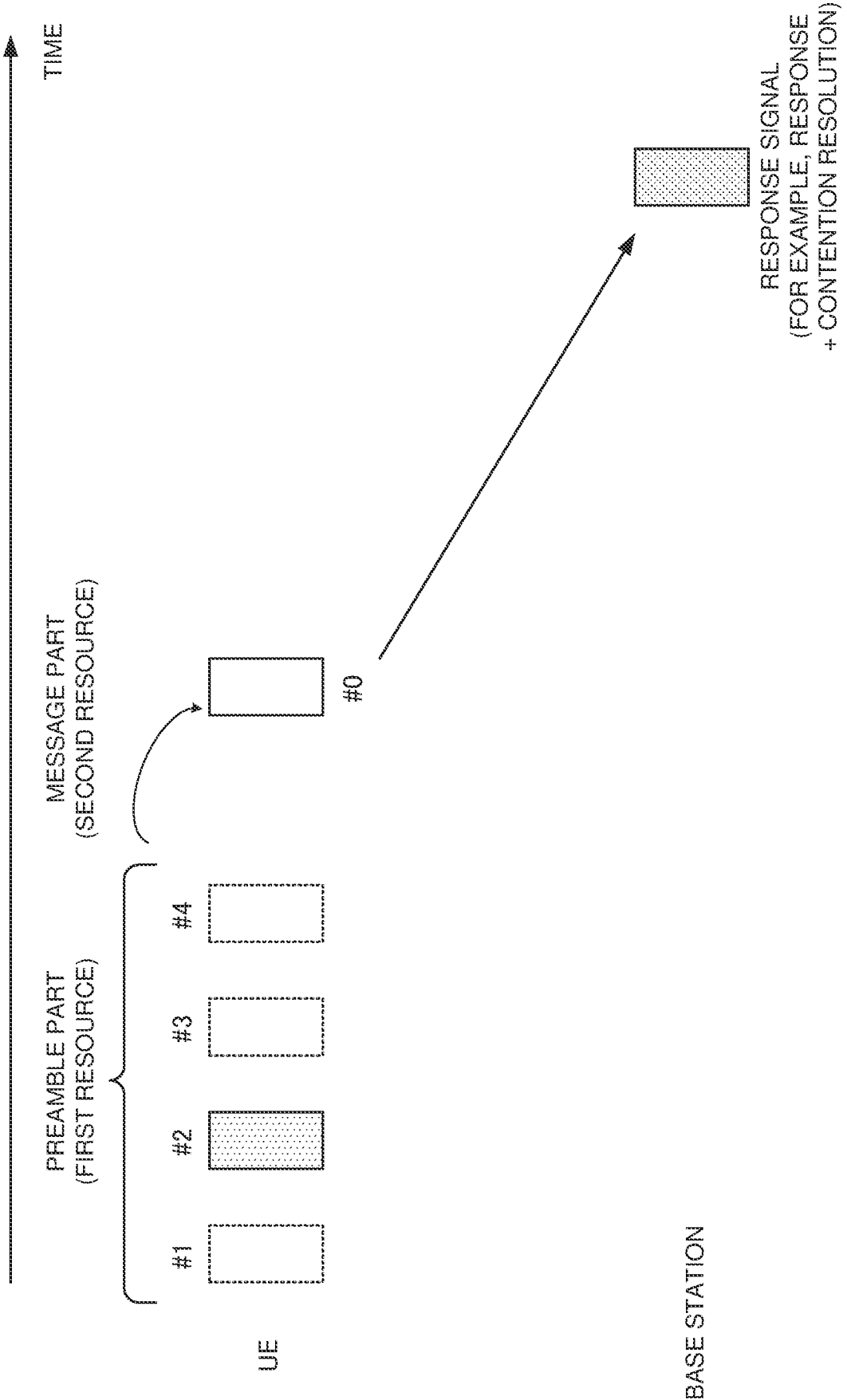
FIG. 9 is a diagram illustrating another example of the method of transmitting a preamble part and a message part.

FIG. 9 illustrates an example of the UE behavior of the first step in the two-step RACH. Here, a case is illustrated where four first resources and one second resource corresponding to the four first resources are configured, but the number of each resource is not limited thereto.

The UE selects the given first resource from the plurality of first resources based on the given conditions (for example, received power of the DL signal/DL channel). For example, the UE selects the first resource associated with the SS/PBCH block or CSI-RS that has the highest received power. The association information between the SS/PBCH block or the CSI-RS and the first resource may be notified in advance from the base station to the UE, or may be defined in advance in the specifications.

Here, the case is illustrated where the first resource associated with the SS/PBCH block or the CSI-RS having high received power is the first resource #2. The UE selects the first resource #2 and transmits the preamble part using the first resource #2 (or the first beam #2). Then, the UE transmits the message part using the common second resource #0 (or the first beam #2).

When receiving the first UL signal and the second UL signal transmitted from the UE, the base station transmits a response signal to the UE after a given duration. The response signal may include a random access response, a message for contention-resolution, and the like. The base station may transmit the response signal using the TRP or beam corresponding to the first resource (or timing received by the base station) used by the UE for transmission.

In this way, by configuring the second resource that is common to the plurality of first resources, it is possible to flexibly control the resource transmission of the preamble part and improve the resource utilization efficiency.

<Beam Form>

In the beam transmission/reception between the base station and the UE, the transmission method using the beam may be appropriately controlled depending on whether or not a beam (Tx BF) applied to the transmission and a beam (Rx BF) applied to the reception by the base station (or UE) match each other.

The case where the beam applied to the transmission and the beam applied to the reception in a base station or the like match each other may be called having (supporting) beam correspondence. On the other hand, the case where the beam applied to the transmission and the beam applied to the reception in a base station or the like do not match each other may be called not having (not supporting) beam correspondence.

The matching of the beam applied to the transmission and the beam applied to the reception is not limited to the case of perfect matching, but also includes the case of matching within a given allowable range. Note that the beam correspondence may be called transmission/reception beam correspondence (Tx/Rx beam correspondence), beam reciprocity, beam calibration, calibrated/non-calibrated, reciprocity calibrated/non-calibrated, a correspondence degree, a matching degree, or simply correspondence.

When the base station has the beam correspondence, the beam applied to the transmission of the DL signal/channel at the base station and the beam applied to the reception of the UL signal transmitted from the UE match each other. Therefore, the base station can determine a beam suitable for transmission/reception to/from the UE by grasping the DL signal/channel (or beam) having high reception characteristics (for example, received power) in the UE.

Figure 10:
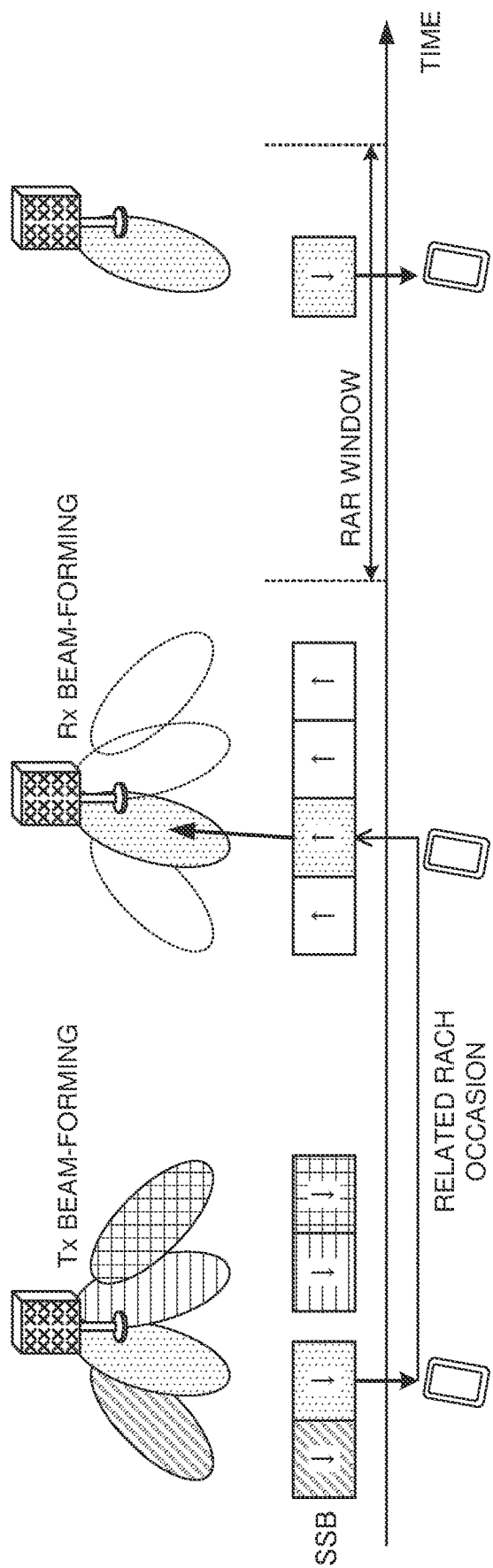
FIG. 10 is a diagram illustrating an example of the transmission method in a case of having beam correspondence.

For example, the base station uses different DL resources (or DL beams) in the time direction to transmit a plurality of synchronization signal blocks (SSBs) or CSI-RSs (see FIG. 10). The UE may select a given SSB based on the reception characteristics (for example, received power) and the like, and use RACH occasion (or UL resource and UL beam) associated with the given SSB to perform the random access procedure (transmission of the preamble part and the message part) in the first step.

The base station performs the reception process for each UL resource associated with each SSB, and determines the given beam suitable for the DL and UL based on the UL resource used for the transmission from the UE. Then, the base station performs the second step (transmission of random access response and contention-resolution) using the given beam.

On the other hand, when the base station does not have the beam correspondence, the beam applied to the transmission of the DL signal/channel at the base station and the beam applied to the reception of the UL signal/channel transmitted from the UE do not match (are not linked to) each other. The base station can determine a beam suitable for the DL transmission by grasping the DL signal/channel having high reception characteristics (for example, received power) in the UE. Further, the base station can determine a beam suitable for the UL reception by grasping the UL signal/channel (or beam) having high reception characteristics among the UL signals/channels transmitted from the UE.

Figure 11:
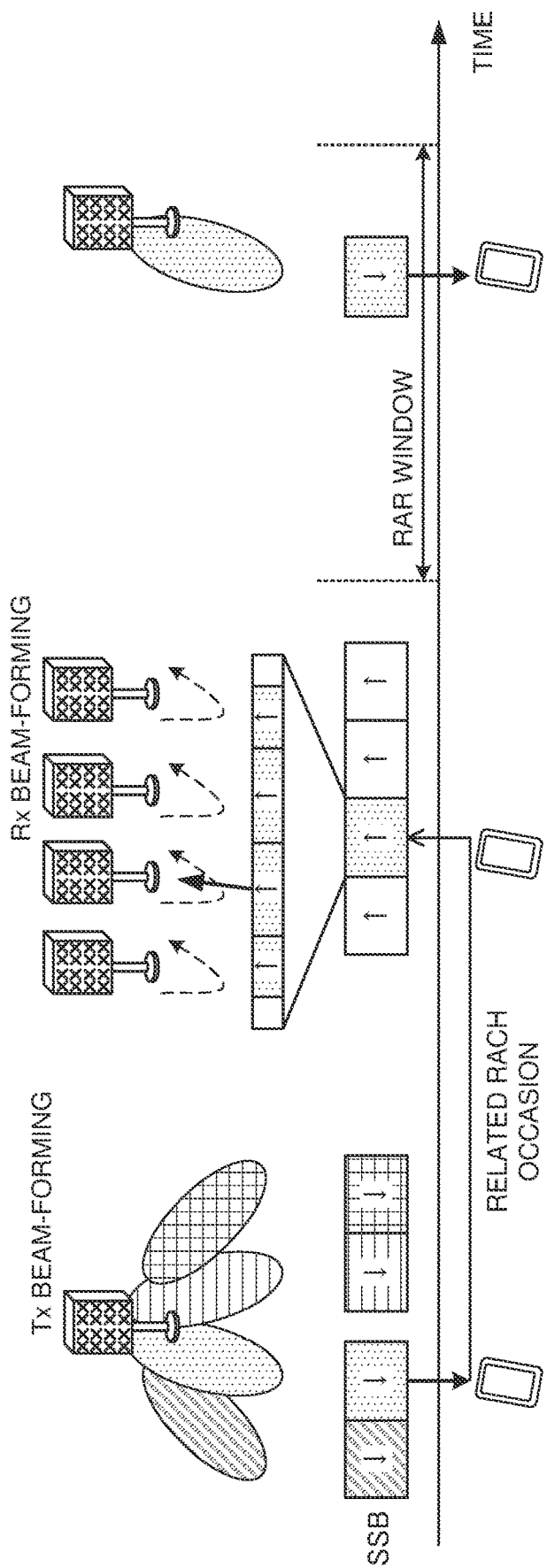
FIG. 11 is a diagram illustrating an example of the transmission method in a case of not having the beam correspondence.

For example, the base station uses different DL resources (or DL beams) in the time direction to transmit a plurality of SSBs or CSI-RSs (see FIG. 11). The UE selects a given SSB based on the reception characteristics (for example, received power) and the like, and uses RACH occasion (or UL resource and UL beam) associated with the given SSB to perform the random access procedure (transmission of the preamble part and the message part) in the first step. In addition, the UE may perform the UL transmission for each of a plurality of symbols as the UL resource.

The base station performs the reception process for each UL resource associated with each SSB, and determines the given transmission beam suitable for the DL based on the UL resource used for the transmission from the UE. Further, the base station determines a given reception beam suitable for the UL based on the reception characteristics of the UL signal transmitted for each given duration (for example, a symbol) in the UL resource associated with the given SSB. Then, the base station performs the second step (transmission of random access response and contention-resolution) using the given transmission beam.

The configuration illustrated in FIGS. 3 to 7 can be suitably applied when the base station has the beam correspondence.

The configuration illustrated in FIGS. 8 and 9 can be suitably applied when the base station does not have the beam correspondence. For example, the UE transmits the preamble part (first UL signal) with different symbols, and the base station performs the reception process for each symbol using different reception beams. On the other hand, the base station may also perform the reception process for the second UL signal by using the reception beam determined based on the reception of the first UL signal.

As a result, even when the base station does not have beam correspondence, the base station can perform the reception using an appropriate reception beam in the reception process of the second UL signal. As a result, the UE does not need to transmit the second UL signal over a plurality of symbols, so the resource utilization efficiency can be improved.

Note that when the base station has the beam correspondence, the configuration illustrated in FIGS. 8 to 9 may be applied, and when the base station does not have beam correspondence, the configuration illustrated in FIGS. 3 to 7 may be applied.

(Third Aspect)

In the third aspect, the control of the transmission of the response signal to the transmission of the first UL signal/UL channel including the preamble part and the second UL signal/UL channel including the message part in the first step of the two-step RACH, and the retransmission when the transmission in the first step fails will be described. Note that the third aspect may be applied to the first aspect and the second aspect, respectively.

The base station transmits the response signal (for example, RAR and contention-resolution) to the first signal (preamble part) and the second signal (message part) transmitted in the first step. In this case, the base station may schedule the downlink shared channel using the downlink control channel (or DCI format) to which the given identifier (RNTI) is applied.

The UE monitors the PDCCH (or DCI format) that is CRC scrambled by a given RNTI and receives the response signal. The given RNTI may be a random access RNTI (RA-RNTI).

Alternatively, in the random access procedure after acquiring a cell RNTI (C-RNTI) on the UE side, the PDCCH (or DCI format) that is CRC scrambled with the C-RNTI may be used as the given RNTI. The random access procedure after acquiring the cell RNTI (C-RNTI) may be at least one of a random access procedure (for example, random access procedure for RRC reconfiguration) after RRC connection, a random access procedure (for example, contention-free random access procedure) using PDCCH order, and a random access procedures for beam failure recovery. Obviously, the random access procedure is not limited thereto.

<Retransmission Control in First Step>

Figure 12:
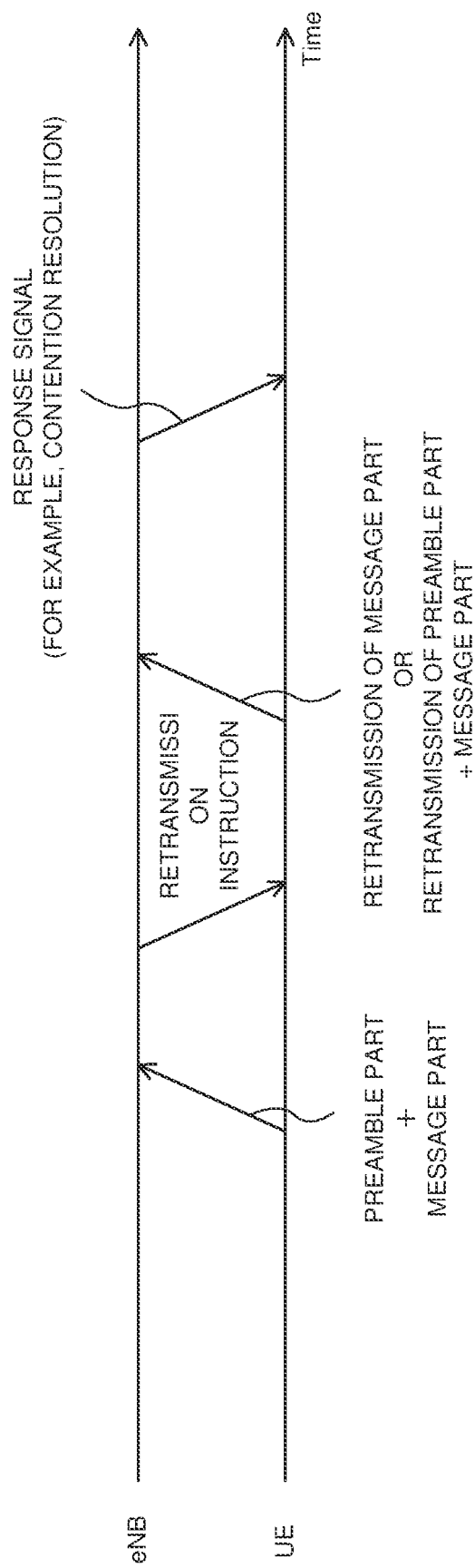
FIG. 12 is a diagram illustrating an example of retransmission control of two-step RACH.

If the transmission of at least one of the first UL signal including the preamble part and the second UL signal including the message part in the first step fails, it may be controlled to perform the retransmission (see FIG. 12). In this case, the base station may transmit the downlink control information (or PDCCH) instructing the UE to perform the retransmission. Alternatively, after transmitting the first UL signal and the second UL signal, the UE may perform retransmission when the response signal is not received within a given duration range. In the following description, a case is illustrated where the base station instructs the UE to perform the retransmission (for example, a signal to be retransmitted or the like), but the present embodiment is not limited thereto.

For example, the retransmission control is assumed in Cases 1 to 3 below. Obviously, the retransmission control is not limited to the following cases.

Case 1: Transmission success of the first UL signal/UL channel and transmission success of the second UL signal/UL channel Case 2: Transmission success of the first UL signal/UL channel and transmission failure of the second UL signal/UL channel Case 3: Transmission failure of the first UL signal/UL channel and transmission failure of the second UL signal/UL channel The transmission success in Cases 1 and 2 may be read as the success of the reception process (for example, the success of decoding or demodulation) in the base station. The transmission failure in Cases 2 and 3 may be read as the failure of the reception process (for example, the failure of decoding or demodulation) in the base station.

In Case 1, the UE does not need to retransmit the preamble part and the message part. In this case, the UE may determine that the random access procedure succeeds by receiving the response signal transmitted from the base station. The C-RNTI may be applied to the transmission (scheduling) of the response signal.

In Case 2, the transmission of the first UL signal including the preamble part succeeds. Therefore, the UE may control to retransmit only the second UL signal including the message part whose transmission has failed. The base station may instruct the UE to retransmit the message part using the downlink control information (or PDCCH). In this way, by the base station notifying the UE of the signal to be retransmitted (for example, only the message part), the UL signal retransmitted by the UE can be reduced.

Note that the message part may perform the retransmission control in the same manner as the message 3 in the four-step random access procedure (for example, the random access procedure specified before Rel. 15). Further, when the UE performs the retransmission control of the message part, it may be assumed that the UE falls back to a four-step random access procedure. Further, the information included in the message 2 (RAR) in the four-step random access procedure may be included in the retransmission instruction notified from the base station.

At least one of the RA-RNTI and the TC-RNTI may be applied as the RNTI applied to the PDCCH (or DCI format) instructing the retransmission of the message part (or message 3). In the RA-RNTI, MAC CE may be used, and in the TC-RNTI, DCI may be used.

Further, when the RA-RNTI is used and when the TC-RNTI is used, the DCI monitoring operation in the UE and the retransmission timing of the message part may be set separately. As a result, the retransmission control of the message part can be flexibly controlled.

Further, when the retransmission is performed plural times, both the RA-RNTI and the TC-RNTI may be applied. For example, the RA-RNTI may be applied for first retransmission, and the TC-RNTI may be applied for second (or after second) retransmission. In this case, the RA-RNTI that controls the first retransmission may be notified to the UE including information on the TC-RNTI.

Note that in Case 2, in addition to the second UL signal/UL channel including the message part, the first UL signal/UL channel including the preamble part may be configured to be retransmitted.

In Case 3, the UE controls to retransmit both the first UL signal including the preamble part and the second UL signal including the message part.

Figure 13:
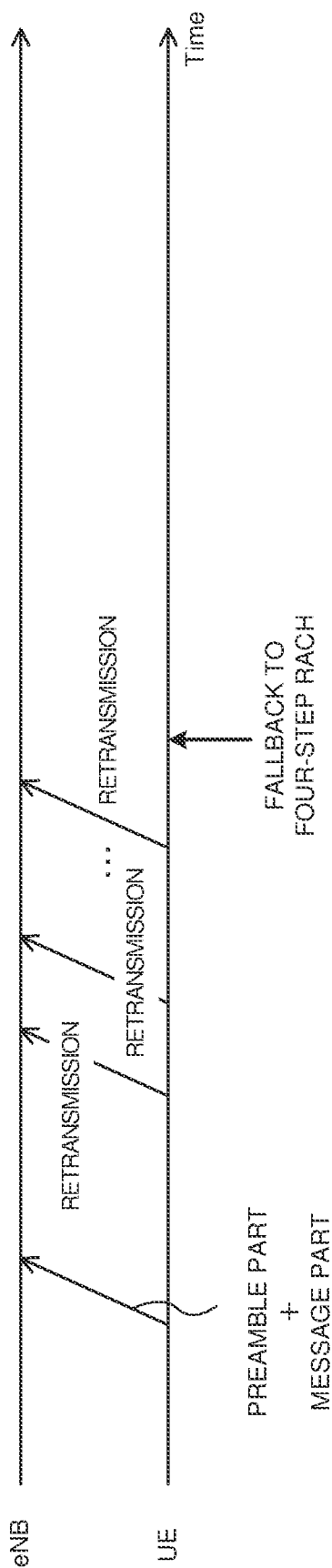
FIG. 13 is a diagram illustrating another example of the retransmission control of the two-step RACH.

When the retransmission of the first UL signal and the second UL signal does not succeed even if performed a given number of times (for example, X), the UE may fall back to the four-step random access procedure and perform the random access procedure (FIG. 13). FIG. 13 illustrates a case where when the retransmission of the preamble part and the message part fails a given number of times (X) (or when the retransmission fails within a given number of times (X)), the UE falls back to the four-step RACH.

The UE may control the four-step random access procedure in consideration of the failure of the two-step random access procedure. For example, in the four-step random access procedure, the maximum number of times of the preamble transmission set by the higher layer parameter (for example, preambleTransMax) is set in the UE from the base station. Based on the maximum number of times of the preamble transmission, the UE determines the criteria for the failure of the random access procedure and whether or not the problem (failure) of the random access procedure is reported to the higher layer.

The four-step random access procedure may be controlled by including the number of times of the failure (X) of the two-step random access procedure in the maximum number of times of the preamble transmission set by the higher layer parameter (for example, preambleTransMax). That is, the interpretation of the higher layer parameter set in the four-step random access procedure may be changed according to the failure of the two-step random access procedure. In this case, the failure of the two-step random access procedure is also taken into consideration, so unnecessary random access procedures can be reduced.

Alternatively, the four-step random access procedure may be controlled by not including the number of times of the failure (X) of the two-step random access procedure in the maximum number of times of the preamble transmission set by the higher layer parameter (for example, preambleTransMax). That is, the interpretation of the higher layer parameter set in the four-step random access procedure may not be changed according to the failure of the two-step random access procedure. In this case, when the four-step random access procedure has a higher success probability, it is possible to improve the success probability of the random access procedure by the falling back.

(Radio Communication System)

Now, the configuration of a radio communication system according to the present embodiment will be described below. In this radio communication system, communication is performed using at least one combination of the above-mentioned plurality of aspects.

Figure 14:
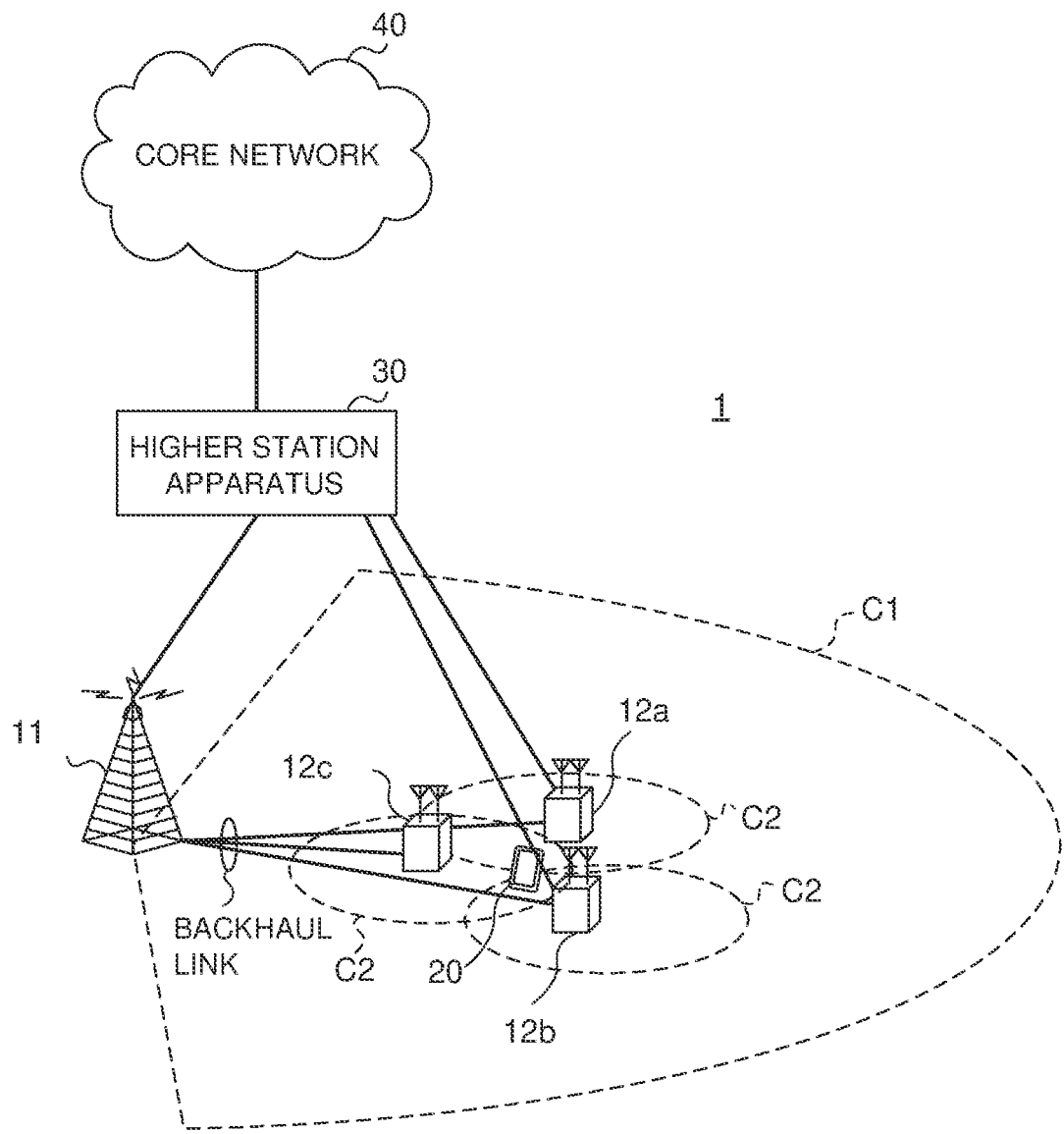
FIG. 14 is a diagram illustrating an example of a schematic configuration of a radio communication system according to the present embodiment.

FIG. 14 is a diagram illustrating an example of a schematic configuration of the radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and the like, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and the like of cells and user terminals 20 are not limited to those illustrated in the drawings.

The user terminals 20 can connect with both the radio base station 11 and the radio base stations 12. The user terminals 20 may use the macro cell C1 and the small cells C2 simultaneously using CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier," a "legacy carrier" and the like). Meanwhile, between the user terminals 20 and the radio base stations 12, a carrier of a relatively high frequency band (for example, 3.5 GHz, 5 GHz, and the like) and a wide bandwidth may be used, or the same carrier as that used between the user terminals 20 and the radio base station 11 may be used. Note that the configuration of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or a channel, and may indicates, for example, at least one of the subcarrier spacing, the bandwidth, symbol length, the cyclic prefix length, the subframe length, the TTI length, the number of symbols per TTI, the radio frame configuration, the filtering processing, the windowing processing, and the like.

The radio base station 11 and the radio base station 12 (or two radio base stations 12) may be connected by wire (for example, an X2 interface or an optical fiber complying with CPRI (common public radio interface)) or wirelessly.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and the like, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," an "aggregate node," an "eNB (eNodeB)," a "transmitting/receiving point" and the like. Also, the radio base stations 12 are radio base stations having local coverages, and may be referred to as "small base stations," "micro base stations," "pico base stations," "femto base stations," "HeNBs (Home eNodeBs)," "RRH (Remote Radio Head)," "transmitting/receiving points" and the like. Hereinafter the radio base stations 11 and 12 will be collectively referred to as "radio base stations 10," when the radio base stations 11 and 12 are not distinguished.

The user terminals 20 are terminals to support various communication schemes such as LTE, LTE-A and the like, and may be either mobile communication terminals (mobile stations) or stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA are applied to the uplink.

OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands configured with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and the like are used as downlink channels. User data, higher layer control information and SIBs (System Information Blocks) are transmitted by the PDSCH. Further, MIB (Master Information Block) is transmitted by PBCH.

The downlink L1/L2 control channels include at least one of a downlink control channel (PDCCH (Physical Downlink Control Channel) and/or an EPDCCH (Enhanced Physical Downlink Control Channel)), a PCFICH (Physical Control Format Indicator Channel), and a PHICH (Physical Hybrid-ARQ Indicator Channel). Downlink control information (DCI), including PDSCH and/or PUSCH scheduling information, and the like, is transmitted by the PDCCH.

Note that scheduling information may be notified via DCI. For example, the DCI to schedule receipt of DL data may be referred to as "DL assignment," and the DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs" and the like) in response to the PUSCH is communicated by the PHICH. The EPDCCH is frequency-division-multiplexed with the PDSCH (downlink shared data channel) and used to communicate with DCI and the like, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and the like are used as uplink channels. User data, higher layer control information, and the like are communicated by the PUSCH. Also, in the PUCCH, downlink radio link quality information (CQI (Channel Quality Indicator)), delivery acknowledgment information, scheduling requests (SRs) and the like are communicated. By means of the PRACH, random access preambles for establishing connections with cells are communicated.

In the radio communication systems 1, cell-specific reference signals (CRSs), channel state information-reference signals (CSI-RSs), demodulation reference signals (DMRSs), positioning reference signals (PRSs) and the like are communicated as downlink reference signals. Also, in the radio communication system 1, measurement reference signals (Sounding Reference Signals (SRSs)), demodulation reference signals (DMRSs), and the like are communicated as uplink reference signals. Note that, DMRSs may be referred to as "user terminal-specific reference signals (UE-specific Reference Signals)." Also, the reference signals to be communicated are by no means limited to these.

<Radio Base Station>

Figure 15:
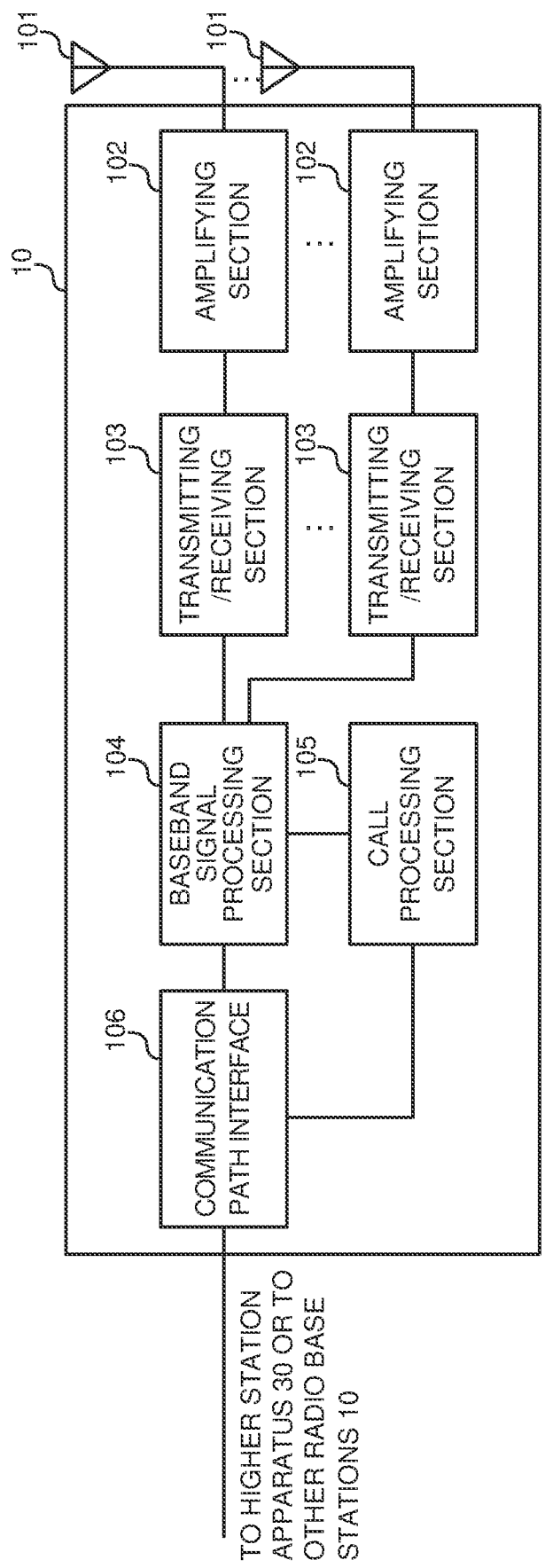
FIG. 15 is a diagram illustrating an example of an overall configuration of a radio base station according to the present embodiment.

FIG. 15 is a diagram illustrating an example of an overall configuration of the radio base station according to the present embodiment. A radio base station 10 has a plurality of transmitting/receiving antennas 101, an amplifying section 102, a transmitting/receiving section 103, a base band signal processing section 104, a call processing section 105 and a communication path interface 106. Note that one or more transmitting/receiving antennas 101, an amplifying section 102, and a transmitting/receiving section 103 may be provided.

User data to be transmitted from the radio base station 10 to a user terminal 20 on the downlink is input from the higher station apparatus 30 to the base band signal processing section 104, via the communication path interface 106.

In the base band signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving section 103.

Base band signals that are pre-coded and output from the base band signal processing section 104 on a per antenna basis are converted into a radio frequency band in the transmitting/receiving section 103, and then transmitted. A radio frequency signal subjected to the frequency conversion in each transmitting/receiving section 103 is amplified in the amplifying section 102, and transmitted from each transmitting/receiving antenna 101. The transmitting/receiving section 103 can be constituted by a transmitter/receiver, a transmitting/receiving circuit or transmitting/receiving apparatus that can be described based on general understanding of the technical field to which the present disclosure pertains. Note that a transmitting/receiving section 103 may be configured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying section 102. The transmitting/receiving section 103 receives the uplink signals amplified in the amplifying section 102. The received signals are converted into the base band signal through frequency conversion in the transmitting/receiving section 103 and output to the base band signal processing section 104.

In the base band signal processing section 104, user data that is included in the uplink signals that are input is subjected to a fast Fourier transform (FFT) process, an inverse discrete Fourier transform (IDFT) process, error correction decoding, a MAC retransmission control reception process, and RLC layer and PDCP layer reception processes, and forwarded to the higher station apparatus 30 via the communication path interface 106. The call processing section 105 performs call processing (such as setting up and releasing) on communication channels, manages the state of the radio base stations 10 and manages the radio resources.

The communication path interface 106 transmits and receives signals to and from the higher station apparatus 30 via a given interface. Also, the communication path interface 106 may transmit and receive signals (backhaul signaling) with other radio base stations 10 via an inter-base station interface (for example, an X2 interface or an optical fiber complying with CPRI (common public radio interface)).

Note that the transmitting/receiving section 103 may further include an analog beam forming section that performs analog beam forming. The analog beam forming section can be constituted by an analog beam forming circuit (for example, a phase shifter, a phase shift circuit) or an analog beam forming apparatus (for example, a phase shifter) described based on general understanding of the technical field to which the present invention pertains. Also, the transmitting/receiving antenna 101 can be constituted by an array antenna, for example. Also, the transmitting/receiving section 103 is configured such that that single BF and multi BF can be used.

The transmitting/receiving section 103 may transmit a signal using a transmission beam and may receive a signal using a reception beam. The transmitting/receiving section 103 may transmit and/or receive a signal using a given beam determined by the control section 301.

In addition, the transmitting/receiving section 103 transmits, to the user terminal 20, the downlink (DL) signal (including at least one of the DL data signal (downlink shared channel), the DL control signal (downlink control channel), and the DL reference signal), and receives, from the user terminal 20, the uplink (UL) signal (including at least one of the UL data signal, the UL control signal, and the UL reference signal).

Further, the transmitting/receiving section 103 receives the first UL signal (or the first UL channel) including the preamble used for the random access and the second UL signal (or the second UL channel) including the message. The transmitting/receiving section 103 transmits a response signal to the first UL signal and the second UL signal after transmitting the second UL signal.

In addition, the transmitting/receiving section 103 may transmit the downlink control to information that instructs to retransmit at least one of the first UL signal and the second UL signal based on the transmission failure of at least one of the first UL signal and the second UL signal transmitted from the UE.

Figure 16:
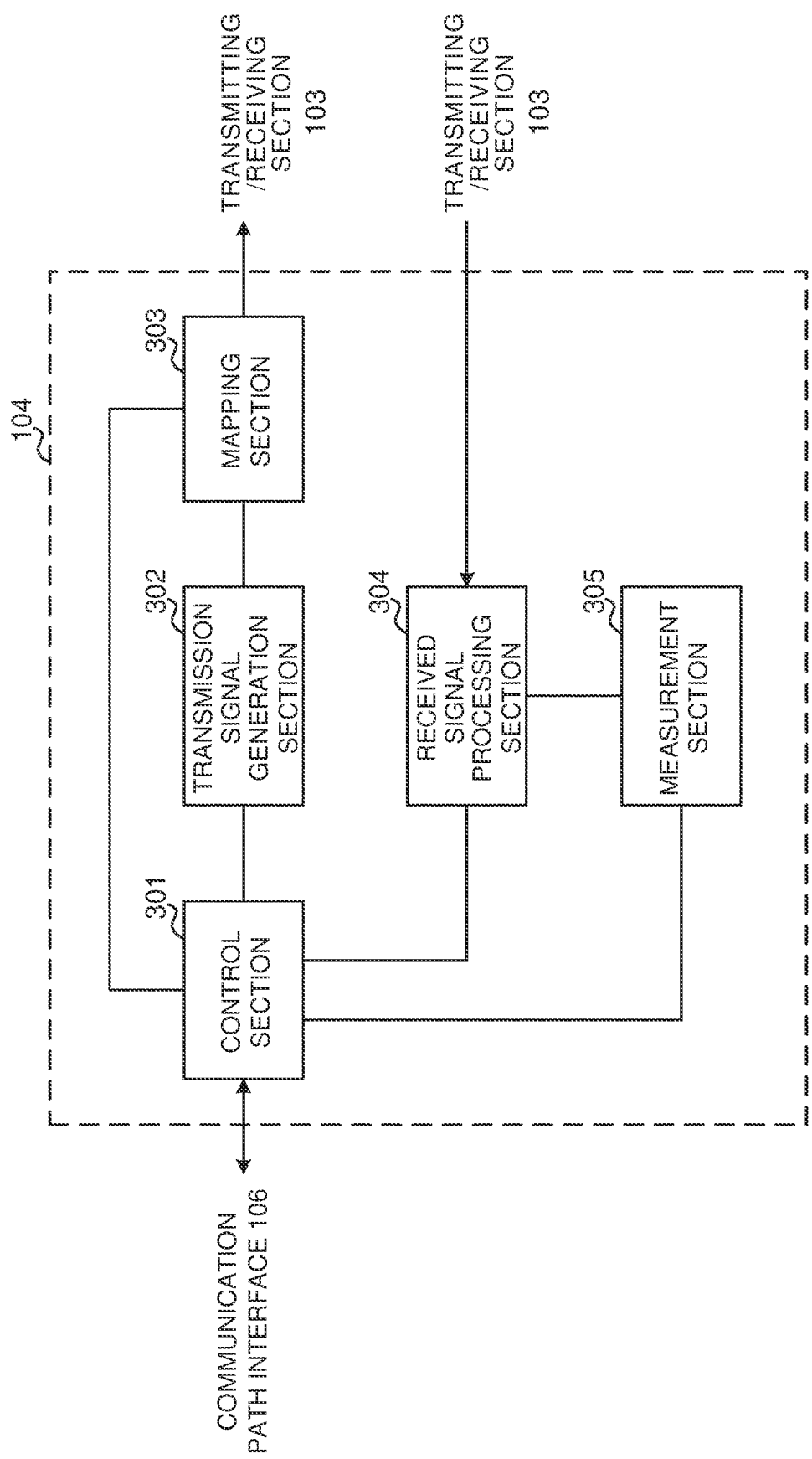
FIG. 16 is a diagram illustrating an example of a functional configuration of the radio base station according to the present embodiment.

FIG. 16 is a diagram illustrating an example of a functional configuration of the radio base station according to the present embodiment. Note that, although this example will primarily show functional blocks that pertain to characteristic parts of the present embodiment, the radio base station 10 may be assumed to have other functional blocks that are necessary for radio communication as well.

The base band signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the base band signal processing section 104.

The control section (scheduler) 301 controls the whole of the radio base station 10. The control section 301 can be constituted by a controller, a control circuit or control apparatus that can be described based on general understanding of the technical field to which the present disclosure pertains.

For example, the control section 301 controls the generation of signals in the transmission signal generation section 302, the allocation of signals in the mapping section 303, and the like. Furthermore, the control section 301 controls the signal reception processes in the received signal processing section 304, the measurements of signals in the measurement section 305, and the like.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgment information). The control section 301 controls the generation of downlink control signals, downlink data signals and the like, based on the results of deciding whether or not retransmission control is necessary for uplink data signals, and the like.

The control section 301 controls the transmission of the response signal (at least one of random access response and contention-resolution) to the transmission of the first UL signal including the preamble and the second UL signal including the message transmitted from the UE.

In addition, the control section 301 may retransmit at least one of the first UL signal and the second UL signal when the reception of at least one of the first UL signal and the second UL signal transmitted from the UE fails. Further, when the reception of the first UL signal fails, the control section 301 may instruct to retransmit the first UL signal and the second UL signal regardless of whether or not the second UL signal is received.

The transmission signal generation section 302 generates downlink signals (downlink control signals, downlink data signals, downlink reference signals and the like) based on instructions from the control section 301, and outputs these signals to the mapping section 303. The transmission signal generation section 302 can be constituted by a signal generator, a signal generating circuit or signal generation apparatus that can be described based on general understanding of the technical field to which the present disclosure pertains.

For example, the transmission signal generation section 302 generates DL assignments, which notify downlink data allocation information, and/or UL grants, which notify uplink data allocation information, based on instructions from the control section 301. DL assignments and UL grants are both DCI, and follow the DCI format. Also, the downlink data signals are subjected to the coding process, the modulation process, and the like, by using coding rates and modulation schemes that are determined based on, for example, channel state information (CSI) notified from each user terminal 20.

The mapping section 303 maps the downlink signals generated in the transmission signal generation section 302 to given radio resources based on instructions from the control section 301, and outputs these to the transmitting/receiving section 103. The mapping section 303 can be constituted by a mapper, a mapping circuit or mapping apparatus that can be described based on general understanding of the technical field to which the present disclosure pertains.

The received signal processing section 304 performs reception processes (for example, demapping, demodulation, decoding and the like) of received signals that are input from the transmitting/receiving section 103. Here, the received signals include, for example, uplink signals (uplink control signals, uplink data signals, uplink reference signals, etc.) that are transmitted from the user terminals 20. The received signal processing section 304 can be constituted by a signal processor, a signal processing circuit or signal processing apparatus that can be described based on general understanding of the technical field to which the present disclosure pertains.

The received signal processing section 304 outputs, to the control section 301, information decoded by the reception process. For example, when a PUCCH to contain an HARQ-ACK is received, the received signal processing section 304 outputs this HARQ-ACK to the control section 301. Also, the received signal processing section 304 outputs the received signals, the signals after the reception processes and the like, to the measurement section 305.

The measurement section 305 conducts measurements with respect to the received signals. The measurement section 305 can be constituted by a measurer, a measurement circuit or measurement apparatus that can be described based on general understanding of the technical field to which the present disclosure pertains.

For example, the measurement section 305 may perform RRM (Radio Resource Management) measurements, CSI (Channel State Information) measurements and the like, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), propagation path information (for example, CSI), and the like. The measurement results may be output to the control section 301.

<User Terminal>

Figure 17:
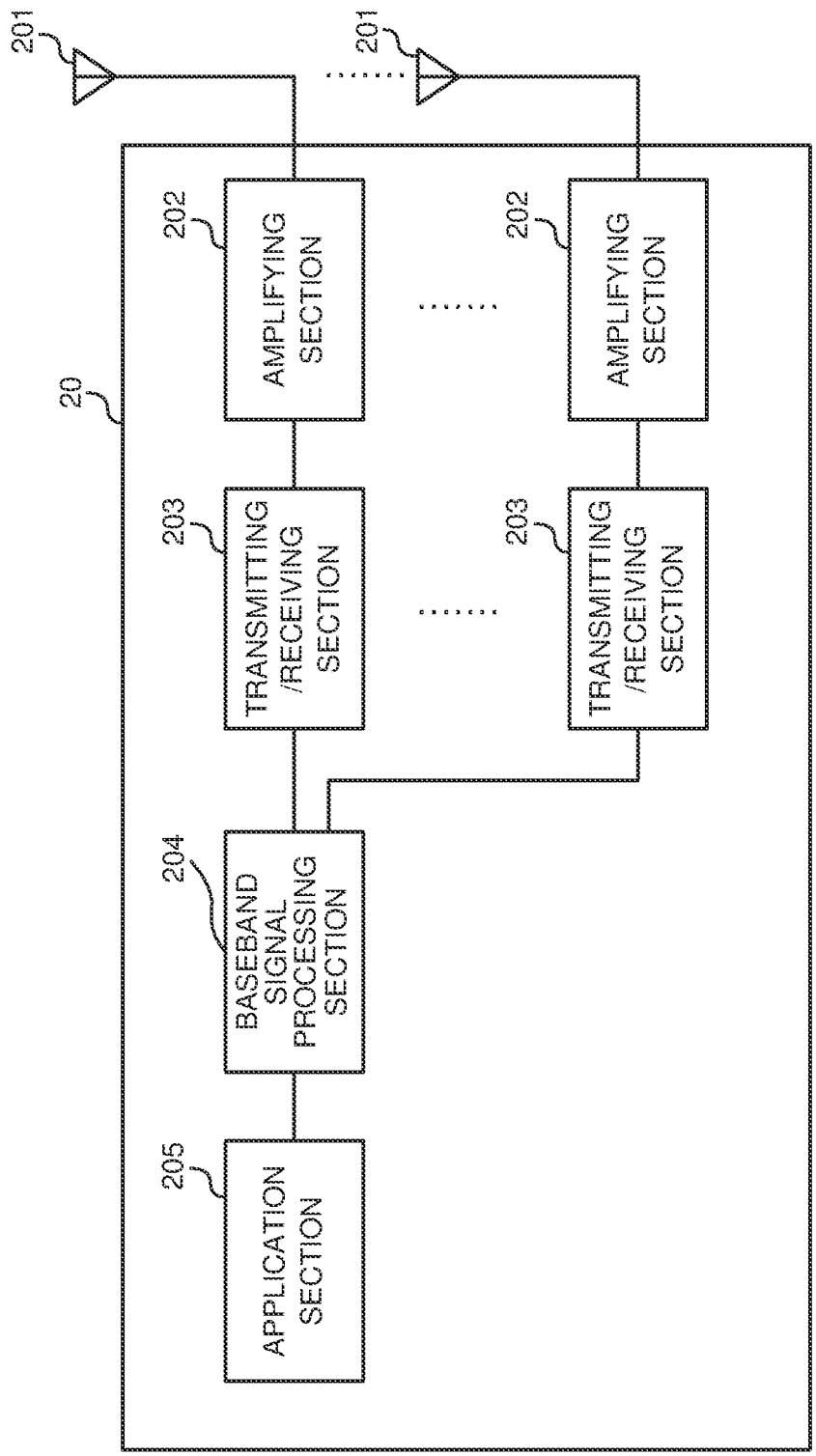
FIG. 17 is a diagram illustrating an example of an overall configuration of a user terminal according to the present embodiment.

FIG. 17 is a diagram illustrating an example of an overall configuration of a user terminal according to the present embodiment. A user terminal 20 has a plurality of transmitting/receiving antennas 201, an amplifying section 202, a transmitting/receiving section 203, a base band signal processing section 204, and an application section 205. Note that one or more transmitting/receiving antennas 201, an amplifying section 202, and a transmitting/receiving section 203 may be provided.

Radio frequency signals that are received in the transmitting/receiving antennas 201 are amplified in the amplifying section 202. The transmitting/receiving section 203 receives the downlink signal amplified in the amplifying section 202. The transmitting/receiving section 203 performs frequency conversion for the received signal into base band signal, and outputs the base band signal to the base band signal processing section 204. The transmitting/receiving section 203 can be constituted by a transmitter/receiver, a transmitting/receiving circuit or transmitting/receiving apparatus that can be described based on general understanding of the technical field to which the present disclosure pertains. Note that a transmitting/receiving section 203 may be configured as a transmitting/receiving section in one entity, or may be constituted by a transmitting section and a receiving section.

The base band signal processing section 204 performs reception processes for the base band signal that is input, including an FFT process, error correction decoding, a retransmission control reception process and the like. Downlink user data is forwarded to the application section 205. The application section 205 performs processes related to higher layers above the physical layer and the MAC layer and the like. Also, in the downlink data, the broadcast information can be also forwarded to the application section 205.

Meanwhile, uplink user data is input from the application section 205 to the base band signal processing section 204. The base band signal processing section 204 performs a retransmission control transmission process (for example, an HARQ transmission process), channel coding, precoding, a discrete Fourier transform (DFT) process, an IFFT process and the like, and the result is forwarded to the transmitting/receiving section 203.

Base band signals that are output from the base band signal processing section 204 are converted into a radio frequency band in the transmitting/receiving section 203 and transmitted. The radio frequency signals having been subjected to frequency conversion in the transmitting/receiving section 203 are amplified in the amplifying section 202, and transmitted from the transmitting/receiving antennas 201.

Note that the transmitting/receiving section 203 may further include an analog beam forming section that performs analog beam forming. The analog beam forming section can be constituted by an analog beam forming circuit (for example, a phase shifter, a phase shift circuit) or an analog beam forming apparatus (for example, a phase shifter) described based on general understanding of the technical field to which the present invention pertains. Also, the transmitting/receiving antenna 201 can be constituted by an array antenna, for example. Also, the transmitting/receiving section 203 is configured such that that single BF and multi BF can be used.

The transmitting/receiving section 203 may transmit a signal using a transmission beam and may receive a signal using a reception beam. The transmitting/receiving section 203 may transmit and/or receive a signal using a given beam determined by the control section 401.

Further, the transmitting/receiving section 203 receives a downlink (DL) signal (including at least one of the DL data signal (downlink shared channel), the DL control signal (downlink control channel), and the DL reference signal) from the radio base station 10, and transmits an uplink (UL) signal (including at least one of the UL data signal, the UL control signal, and the UL reference signal) to the radio base station 10.

Further, the transmitting/receiving section 203 transmits the first UL signal (or the first UL channel) including the preamble used for the random access and the second UL signal (or the second UL channel) including the message. The transmitting/receiving section 203 receives a response signal to the first UL signal and the second UL signal after transmitting the second UL signal.

In addition, the transmitting/receiving section 203 retransmits at least one of the first UL signal and the second UL signal based on the transmission failure of at least one of the first UL signal and the second UL signal. In addition, the transmitting/receiving section 203 may receive the downlink control information instructing the retransmission.

Figure 18:
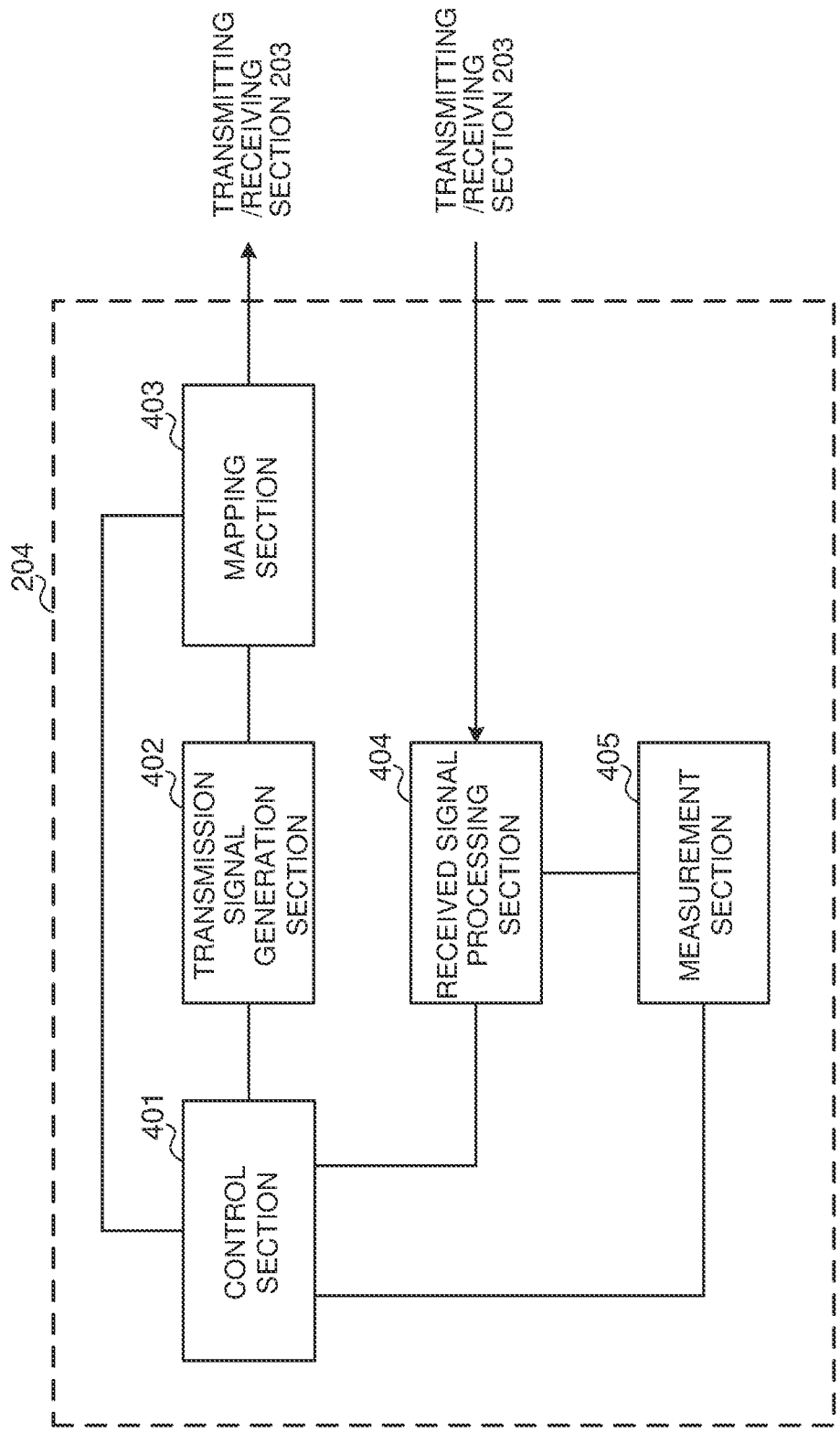
FIG. 18 is a diagram illustrating an example of a functional configuration of the user terminal according to the present embodiment.

FIG. 18 is a diagram illustrating an example of a functional configuration of the user terminal according to the present embodiment. Note that, although this example will primarily show functional blocks that pertain to characteristic parts of the present embodiment, it may be assumed that the user terminals 20 have other functional blocks that are necessary for radio communication as well.

The base band signal processing section 204 provided in the user terminal 20 at least has a control section 401, a transmission signal generation section 402, a mapping section 403, a received signal processing section 404 and a measurement section 405. Note that these configurations may be included in the user terminal 20, and some or all of the configurations need not be included in the base band signal processing section 204.

The control section 401 controls the whole of the user terminal 20. The control section 401 can be constituted by a controller, a control circuit or control apparatus that can be described based on general understanding of the technical field to which the present disclosure pertains.

The control section 401, for example, controls the generation of signals in the transmission signal generation section 402, the allocation of signals in the mapping section 403, and the like. Furthermore, the control section 401 controls the signal reception processes in the received signal processing section 404, the measurements of signals in the measurement section 405 and the like.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and the like.

The control section 401 controls transmission by applying at least one of the frequency multiplexing and the time multiplexing to the first UL signal and the second UL signal. For example, the control section 401 may select a given combination from the combinations of the first UL signal and the second UL signal to which at least one of the frequency multiplexing and the time multiplexing is applied based on the DL signal.

When the first UL signal and the second UL signal are time-multiplexed, the transmission duration of the second UL signal may be set separately for each first UL signal. Alternatively, when the first UL signal and the second UL signal are time-multiplexed, the transmission duration of the second UL signal may be set in common for the plurality of first UL signals.

Further, a given gap interval may be set between the first UL signal having the latest transmission timing among the plurality of first UL signals and the transmission timing of the second transmission. Also, the gap interval may be set between the first UL signal and the second UL signal associated with different DL signals.

In addition, the control section 401 may retransmit at least one of the first UL signal and the second UL signal based on the transmission failure of at least one of the first UL signal and the second UL signal. In addition, the control section 401 may control the retransmission based on the retransmission instruction transmitted from the base station.

Further, when the transmission of the first UL signal succeeds and the transmission of the second UL signal fails, the control section 401 may use the uplink shared channel scheduled by the downlink control information to perform the retransmission of the second UL signal. As random access RNTI (RA-RNTI) or a temporary cell RNTI (TC-RNTI), the downlink control channel on which the downlink control information is transmitted may be applied.

Moreover, the control section 401 may retransmit the first UL signal and the second UL signal when the transmission of the first UL signal fails. For example, when the reception of the first UL signal fails, the control section 401 may instruct to retransmit the first UL signal and the second UL signal regardless of whether or not the second UL signal is received.

Further, when the transmission of the first UL signal and the second UL signal fails a given number of times, the control section 401 may perform a random access procedure (fall back to the four-step RACH) including the procedure from message 1 to message 4.

Further, the control section 401 may be configured to include the number of times of the transmission of at least one of the first UL signal and the second UL signal in counting the maximum number of times of the random access preamble transmission in the random access procedure including the procedure from message 1 to message 4.

Further, the control section 401 may be configured not to include the number of times of the transmission of at least one of the first UL signal and the second UL signal in counting the maximum number of times of the random access preamble transmission in the random access procedure including the procedure from message 1 to message 4.

The transmission signal generation section 402 generates uplink signals (uplink control signals, uplink data signals, uplink reference signals, etc.) based on instructions from the control section 401, and outputs these signals to the mapping section 403. The transmission signal generation section 402 can be constituted by a signal generator, a signal generating circuit or signal generation apparatus that can be described based on general understanding of the technical field to which the present disclosure pertains.

For example, the transmission signal generation section 402 generates uplink control signals such as delivery acknowledgment information, channel state information (CSI) and the like, based on instructions from the control section 401. Also, the transmission signal generation section 402 generates uplink data signals based on instructions from the control section 401. For example, when a UL grant is included in a downlink control signal that is notified from the radio base station 10, the control section 401 commands the transmission signal generation section 402 to generate an uplink data signal.

The mapping section 403 maps the uplink signals generated in the transmission signal generation section 402 to radio resources based on instructions from the control section 401, and output the result to the transmitting/receiving section 203. The mapping section 403 can be constituted by a mapper, a mapping circuit or mapping apparatus that can be described based on general understanding of the technical field to which the present disclosure pertains.

The received signal processing section 404 performs reception processes (for example, demapping, demodulation, decoding and the like) of received signals that are input from the transmitting/receiving section 203. Here, the received signals include, for example, downlink signals (downlink control signals, downlink data signals, downlink reference signals, and the like) that are transmitted from the radio base station 10. The received signal processing section 404 can be constituted by a signal processor, a signal processing circuit or signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the reception processes to the control section 401. The received signal processing section 404 outputs, for example, broadcast information, system information, RRC signaling, DCI, and the like, to the control section 401. Also, the received signal processing section 404 outputs the received signals and/or the signals after the reception processes to the measurement section 405.

The measurement section 405 conducts measurements with respect to the received signals. The measurement section 405 can be constituted by a measurer, a measurement circuit or measurement apparatus that can be described based on general understanding of the technical field to which the present disclosure pertains.

For example, the measurement section 405 may perform RRM measurements, CSI measurements and the like based on the received signals. The measurement section 405 may measure the received power (for example, RSRP), the received quality (for example, RSRQ, SINR, SNR, etc.), the signal strength (for example, RSSI), propagation path information (for example, CSI), and the like. The measurement results may be output to the control section 401.

(Hardware Configuration)

Note that the block diagrams that have been used to describe the above embodiments illustrate blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses. The functional blocks may be realized by combining software with the one apparatus or the plural apparatuses mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. In any case, as described above, the realization method is not particularly limited to any one method.

Figure 19:
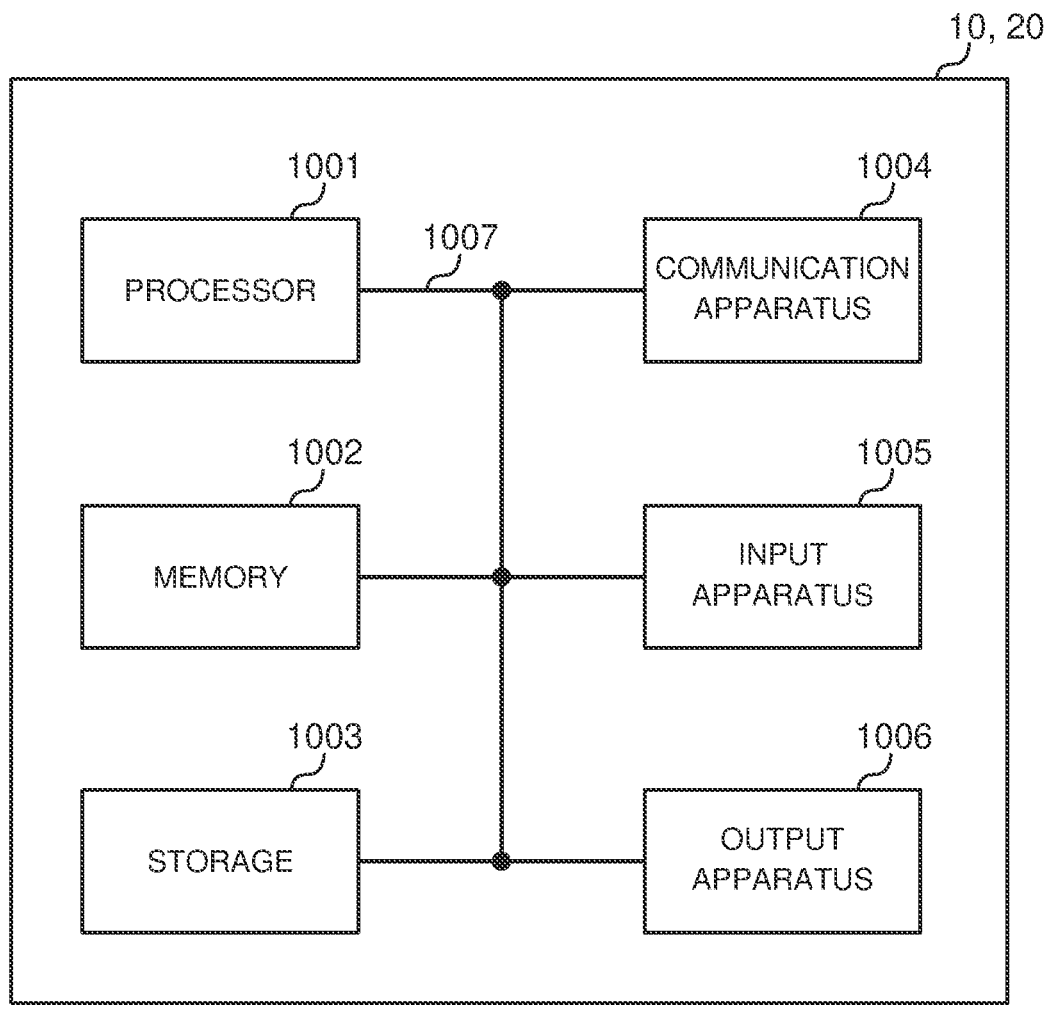
FIG. 19 is a diagram illustrating an example of a hardware configuration of the radio base station and the user terminal according to the present embodiment.

For example, the base station, the user terminal, and the like according to the embodiment of the present disclosure may function as a computer that executes the processes of the radio communication method of the present disclosure. FIG. 19 is a diagram illustrating an example of a hardware configuration of the base station and the user terminal according to the embodiment. Physically, the above-described base stations 10 and user terminal 20 may be configured as a computer apparatus including a processor 1001, a memory 1002, a storage 1003, a communication apparatus 1004, an input apparatus 1005, an output apparatus 1006, a bus 1007, and the like.

Note that, in the following description, the word "apparatus" may be replaced by "circuit," "device," "unit" and the like. The hardware configuration of the base station 10 and the user terminal 20 may be configured to include one or more of each apparatus illustrated in the drawings, or may be configured not to include part of the apparatus.

For example, although only one processor 1001 is illustrated, a plurality of processors may be provided. Furthermore, processes may be implemented with one processor, or processes may be implemented at the same time, in sequence, or in different manners, on two or more processors. Note that the processor 1001 may be implemented with one or more chips.

Each function of the base station 10 and the user terminal 20 causes the processor 1001 to perform computation by reading a given software (program) on hardware such as the processor 1001 and the memory 1002, and is implemented by controlling communication via the communication apparatus 1004, and controlling at least one of reading and writing of data on the memory 1002 and the storage 1003.

The processor 1001 may control the whole computer by, for example, running an operating system. The processor 1001 may be configured with a central processing unit (CPU), which includes interfaces with peripheral equipment, control apparatus, computing apparatus, a register and the like. For example, the above-described base band signal processing section 104 (204), call processing section 105 and the like may be implemented by the processor 1001.

Furthermore, the processor 1001 reads programs (program codes), software modules, or data, from at least one of the storage 1003 and the communication apparatus 1004, into the memory 1002, and executes various processes according to these. As for the programs, programs to allow computers to execute at least part of the operations described in the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (main storage device)" and the like. The memory 1002 can store a program (program code), a software module, and the like, which are executable for implementing the radio communication method according to the embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and the like), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer and the like in order to implement, for example, at least one of frequency division duplex (FDD) and time division duplex (TDD). For example, the above-described transmitting/receiving antennas 101 (201), amplifying section 102 (202), transmitting/receiving section 103 (203), communication path interface 106, and the like may be implemented by the communication apparatus 1004. The transmitting/receiving section 103 may be implemented by physically or logically separating the transmitting section 103a and the receiving section 103b.

The input apparatus 1005 is an input device for receiving input from the outside (for example, a keyboard, a mouse, a microphone, a switch, a button, a sensor and the like). The output apparatus 1006 is an output device for allowing output to the outside (for example, a display, a speaker, an LED (Light Emitting Diode) lamp, and the like). Note that the input apparatus 1005 and the output apparatus 1006 may be provided in an integrated configuration (for example, a touch panel).

Furthermore, these pieces of apparatus, including the processor 1001, the memory 1002 and the like are connected by the bus 1007 so as to communicate information. The bus 1007 may be formed with a single bus, or may be formed with buses that vary between pieces of apparatus.

Also, the base station 10 and the user terminal 20 may be configured to include hardware such as a microprocessor, a digital signal processor (DSP), an ASIC (Application-Specific Integrated Circuit), a PLD (Programmable Logic Device), an FPGA (Field Programmable Gate Array) and the like, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced with other terms that convey the same or similar meanings. For example, at least one of "channels" and "symbols" may be replaced by "signals" (or "signaling"). The signal may also be a message. A reference signal may be abbreviated as an RS, and may be referred to as a pilot, a pilot signal, and the like, depending on which standard applies. Furthermore, a "component carrier (CC)" may be referred to as a "cell," a "frequency carrier," a "carrier frequency" and the like.

A radio frame may be comprised of one or more periods (frames) in the time domain. Each of one or a plurality of periods (frames) constituting a radio frame may be referred to as a subframe. Furthermore, a subframe may be comprised of one or a plurality of slots in the time domain. A subframe may be a fixed time duration (for example, 1 ms) that is not dependent on numerology.

Here, the numerology may be a communication parameter used for at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, a specific windowing processing performed by the transceiver in the time domain, and the like.

A slot may be comprised of one or more symbols in the time domain (OFDM (Orthogonal Frequency Division Multiplexing) symbols, SC-FDMA (Single Carrier Frequency Division Multiple Access) symbols, and the like). Also, a slot may be a time unit based on numerology.

A slot may include a plurality of mini slots. Each mini slot may be comprised of one or more symbols in the time domain. Also, a mini slot may be referred to as a "subslot." Each mini slot may be comprised of fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be referred to as "PDSCH (PUSCH) mapping type B."

A radio frame, a subframe, a slot, a mini slot and a symbol all represent the time unit in signal communication. A radio frame, a subframe, a slot, a mini slot and a symbol may be each called by other applicable names. Note that time units such as a frame, a subframe, a slot, a mini slot, and a symbol in the present disclosure may be replaced with each other.

For example, one subframe may be referred to as a "transmission time interval (TTI)," or a plurality of consecutive subframes may be referred to as a "TTI," or one slot or one mini slot may be referred to as a "TTI." That is, at least one of a subframe and a TTI may be a subframe (1 ms) in the existing LTE, may be a shorter period than 1 ms (for example, one to thirteen symbols), or may be a longer period of time than 1 ms. Note that the unit to represent the TTI may be referred to as a "slot," a "mini slot" and the like, instead of a "subframe."

Here, a TTI refers to the minimum time unit of scheduling in radio communication, for example. For example, in an LTE system, a base station performs scheduling that allocates radio resources (frequency bandwidths, transmit power, and the like, that can be used in each user terminal) to each user terminal in a unit of the TTI. Note that the definition of TTIs is not limited to this.

The TTI may be the transmission time unit of channel-encoded data packets (transport blocks), code blocks, codewords and the like, or may be the unit of processing in scheduling, link adaptation and the like. When TTI is given, a time interval (for example, the number of symbols) in which the transport blocks, the code blocks, the codewords, and the like are actually mapped may be shorter than TTI.

Note that, when one slot or one mini slot is referred to as a "TTI," one or more TTIs (that is, one or multiple slots or one or more mini slots) may be the minimum time unit of scheduling. Also, the number of slots (the number of mini slots) to constitute this minimum time unit of scheduling may be controlled.

TTI having a time length of 1 ms may be called usual TTI (TTI in LTE Rel. 8 to 12), normal TTI, long TTI, a usual subframe, a normal subframe, a long subframe, a slot, or the like. A TTI that is shorter than a usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be, for example, 12. The number of subcarriers included in the RB may be determined based on the numerology.

Also, an RB may include one or more symbols in the time domain, and may be one slot, one mini slot, one subframe or one TTI in length. One TTI and one subframe each may be comprised of one or more resource blocks.

Note that one or more RBs may be referred to as a "physical resource block (PRB (Physical RB))," a "subcarrier group (SCG)," a "resource element group (REG)," a "PRB pair," an "RB pair" and the like.

Furthermore, a resource block may be comprised of one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by an index of RBs based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured in one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

Note that the structures of radio frames, subframes, slots, mini slots, symbols and the like described above are merely examples. For example, configurations pertaining to the number of subframes included in a radio frame, the number of slots included in a subframe or a radio frame, the number of mini slots included in a slot, the number of symbols and RBs included in a slot or a mini slot, the number of subcarriers included in an RB, the number of symbols in a TTI, the symbol length, the length of cyclic prefixes (CPs) and the like can be variously changed.

Also, the information and parameters described in the present disclosure may be represented in absolute values or in relative values with respect to given values, or may be represented using other applicable information. For example, a radio resource may be specified by a given index.

The names used for parameters and the like in the present disclosure are in no respect limiting. In addition, an equation and the like using these parameters may differ from those explicitly disclosed in the present disclosure. Since various channels (PUCCH (Physical Uplink Control Channel), PDCCH (Physical Downlink Control Channel) and the like) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals and the like may be input and output via a plurality of network nodes.

The information, signals and the like that are input and/or output may be stored in a specific location (for example, in a memory), or may be managed in a control table. The information, signals, and the like that are input and/or output can be overwritten, updated, or appended. The information, signals, and the like that are output may be deleted. The information, signals and the like that are input may be transmitted to other pieces of apparatus.

The notification of information is by no means limited to the aspects/embodiments described in the present disclosure, and may be performed using other methods. For example, notification of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and the like), MAC (Medium Access Control) signaling and the like), and other signals and/or combinations of these.

Note that physical layer signaling may be referred to as "L1/L2 (Layer 1/Layer 2) control information (L1/L2 control signals)," "L1 control information (L1 control signal)" and the like. Also, RRC signaling may be referred to as RRC messages, and can be, for example, an RRC connection setup (RRCConnectionSetup) message, RRC connection reconfiguration (RRCConnectionReconfiguration) message, and the like. Also, MAC signaling may be notified using, for example, MAC control elements (MAC CEs (Control Elements)).

Also, notification of given information (for example, notification of information to the effect that "X holds") does not necessarily have to be sent explicitly, and can be sent implicitly (for example, by not notifying this piece of information, by notifying another piece of information, and the like).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and the like.

Also, software, commands, information and the like may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "precoding", "precoder", "weight (precoding weight)", "quasi-co-location (QCL)", "transmit power", "phase rotation", "antenna port", "antenna port group", "layer", "number of layers", "rank", "beam", "beam width", "beam angle", "antenna", "antenna element", and "panel" may be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier," may be used interchangeably. The base station may be called a term such as a macro cell, a small cell, a femto cell, a pico cell, and the like.

The base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (RRH: Remote Radio Head)). The term "cell" or "sector" refers to all or part of the coverage area of at least one of a base station and a base station subsystem that provides communication services within this coverage.

In the present disclosure, the terms "mobile station (MS)", "user terminal", "user equipment (UE)", "terminal", etc. may be used interchangeably.

A mobile station may be referred to as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other suitable terms.

At least one of the base station and the mobile station may be referred to as a transmitting apparatus, a receiving apparatus, a communication apparatus, and the like. Note that at least one of the base station and the mobile station may be a device mounted on a mobile unit, a mobile unit itself, or the like. The mobile unit may be a vehicle (such as a car, an airplane, for example), an unmanned mobile unit (such as a drone, an autonomous vehicle, for example), or a robot (manned or unmanned). Note that at least one of the base station and the mobile station also includes an apparatus that does not necessarily move during a communication operation. For example, at least one of a base station and a mobile station may be IoT (Internet of Things) device such as a sensor.

Further, the base stations in the present disclosure may be read as the user terminal. For example, each aspect/embodiment of the present disclosure may be applied to a configuration in which communication between the base station and the user terminal is replaced by communication among a plurality of user terminals (which may be referred to as, for example, D2D (Device-to-Device), V2X (Vehicle-to-Everything) and the like). In this case, the user terminal 20 may be configured to have the functions of the base station 10 described above. In addition, the wording such as "uplink" and "downlink" may be replaced with the wording (for example, "side") corresponding to the terminal-to-terminal communication. For example, an uplink channel and a downlink channel may be interpreted as a side channel.

Similarly, the user terminal in the present disclosure may be read as the base station. In this case, the base station 10 may be configured to have the functions of the user terminals 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and the like may be possible, but these are not limiting) other than base stations, or combinations of these.

The aspects/embodiments illustrated in the present disclosure may be used individually or in combinations, which may be switched depending on the mode of implementation. The order of processes, sequences, flowcharts and the like that have been used to describe the aspects/embodiments in the present disclosure may be re-ordered as long as inconsistencies do not arise. For example, although various methods have been illustrated in the present disclosure with various components of steps using exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on."

Reference to elements with designations such as "first," "second" and the like as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The terms "determining (judging)" as used in the present disclosure may encompass a wide variety of actions. For example, "determining (judging)" may be regarded as "determining" of judging, calculating, computing, processing, deriving, investigating, looking up (search, inquiry) (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and the like.

In addition, to "judge" and "determine" as used herein may be interpreted to mean making judgements and determinations related to resolving, selecting, choosing, establishing, comparing and the like. In other words, to "judge" and "determine" as used herein may be interpreted to mean making judgements and determinations related to some action.

In addition, to "judge" and "determine" as used herein may be interpreted to mean "assuming", "expecting", "considering" and the like.

As used in the present disclosure, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced by "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other." It should be noted that the term may mean "A and B are each different from C". Terms such as "leave", "coupled", or the like may also be interpreted in the same manner as "different".

When the terms such as "include," "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of the claims. Consequently, the description in the present disclosure is provided only for the purpose of explaining examples, and should by no means be construed to limit the invention according to the present disclosure in any way.

The invention claimed is:

1. A terminal comprising:
   a receiver that receives a synchronization signal block (SSB);
   a processor that:
      determines, based on the SSB, a time resource for a preamble used for a 2-step random access procedure, and
      determines, based on the SSB, a time resource for an uplink shared channel (PUSCH) used for the random access procedure; and
   a transmitter that transmits the preamble and the PUSCH,
   wherein the time resource for the PUSCH is determined in common for a plurality of the preambles, and
   wherein a given gap interval is configured between a preamble having a latest transmission timing among the plurality of the preambles and a transmission timing of the PUSCH transmission.

2. A radio communication method for a terminal, comprising:
   receiving a synchronization signal block (SSB);
   determining, based on the SSB, a time resource for a preamble used for a 2-step random access procedure; and
   determining, based on the SSB, a time resource for an uplink shared channel (PUSCH) used for the random access procedure; and
   transmitting the preamble and the PUSCH,
   wherein the time resource for the PUSCH is determined in common for a plurality of the preambles, and
   wherein a given gap interval is configured between a preamble having a latest transmission timing among the plurality of the preambles and a transmission timing of the PUSCH transmission.

3. A base station comprising:
   a transmitter that transmits a synchronization signal block (SSB); and
   a receiver that:
      receives a preamble which is transmitted in a time resource for the preamble determined based on the SSB and is used for a 2-step random access procedure, and
      receives an uplink shared channel (PUSCH) which is transmitted in a time resource for the PUSCH determined based on the SSB and is used for the random access procedure,
   wherein the time resource for the PUSCH is determined in common for a plurality of the preambles, and
   wherein a given gap interval is configured between a preamble having a latest reception timing among the plurality of the preambles and a reception timing of the PUSCH reception.

4. A system comprising a terminal and a base station, wherein
   the terminal comprises:
      a receiver of the terminal that receives a synchronization signal block (SSB);
      a processor that:
         determines, based on the SSB, a time resource for a preamble used for a 2-step random access procedure, and
         determines, based on the SSB, a time resource for an uplink shared channel (PUSCH) used for the random access procedure; and
      a transmitter that transmits the preamble and the PUSCH,
      wherein the time resource for the PUSCH is determined in common for a plurality of the preambles, and
      wherein a given gap interval is configured between a preamble having a latest transmission timing among the plurality of the preambles and a transmission timing of the PUSCH transmission, and
   the base station comprises:
      a receiver of the base station that receives the preamble and the PUSCH.

* * * * *